(12) United States Patent
Miyajima et al.

(10) Patent No.: US 7,464,966 B2
(45) Date of Patent: Dec. 16, 2008

(54) THROUGH-PANEL FIXING DEVICE FOR PIPING MEMBER

(75) Inventors: Atsuo Miyajima, Inuyama (JP);
Masayuki Sasagawa, Kasugai (JP);
Yuichi Wada, Inazawa (JP); Naomasa Kaneko, Wako (JP); Toshikazu Ono, Wako (JP)

(73) Assignee: Tokai Rubber Industries, Inc. (JP)

( * ) Notice: Subject to any disclaimer, the term of this patent is extended or adjusted under 35 U.S.C. 154(b) by 74 days.

(21) Appl. No.: 11/168,739

(22) Filed: Jun. 28, 2005

(65) Prior Publication Data

US 2006/0001261 A1 Jan. 5, 2006

(30) Foreign Application Priority Data

Jun. 30, 2004 (JP) ............................ 2004-195027
Feb. 4, 2005 (JP) ............................ 2005-028966

(51) Int. Cl.
*F16L 39/00* (2006.01)
*F16L 5/00* (2006.01)

(52) U.S. Cl. .............. 285/124.3; 285/124.2; 285/124.4; 285/124.5; 285/139.1; 248/56; 248/65; 248/68.1; 248/74.1; 248/74.2

(58) Field of Classification Search .............. 285/124.1, 285/124.2, 124.3, 124.4, 124.5, 139.1; 248/68.1, 248/65, 56, 74.1, 74.2, 74.4
See application file for complete search history.

(56) References Cited

U.S. PATENT DOCUMENTS

| | | | | |
|---|---|---|---|---|
| 3,092,361 A | * | 6/1963 | Cook | 248/56 |
| 3,564,113 A | * | 2/1971 | Kindler | 174/656 |
| 4,002,821 A | * | 1/1977 | Satoh et al. | 174/153 G |
| 4,482,172 A | * | 11/1984 | DeVera et al. | 285/140.1 |
| 4,517,408 A | * | 5/1985 | Pegram | 174/153 G |
| 4,775,121 A | * | 10/1988 | Carty | 248/68.1 |
| 5,029,782 A | * | 7/1991 | Andre et al. | 248/68.1 |
| 5,071,169 A | * | 12/1991 | Moschet | 285/62 |

(Continued)

FOREIGN PATENT DOCUMENTS

JP 56-158579 U 11/1981

(Continued)

OTHER PUBLICATIONS

Japanese Patent 2001-200976, along with a machine generated translation Date: Jul. 27, 2001.

(Continued)

*Primary Examiner*—James M Hewitt
*Assistant Examiner*—Jay R Ripley
(74) *Attorney, Agent, or Firm*—Andrus, Sceales, Starke & Sawall, LLP

(57) ABSTRACT

A piping member is mounted in a mounting hole of one panel by a first holder and in a mounting hole of the other panel by a second holder, respectively. Each of the first and the second holders has a through-hole for receiving the piping member therethrough, and a fit-in projecting portion that is fitted in the mounting hole so as to be positioned. Each of the first and the second holders also has a resilient lug and a collar portion for cooperatively clamping the panel with its inner and outer surfaces therebetween. The first holder holds the piping member relatively movably axially with respect to the first holder therethrough, while the second holder securely fixes the piping member axially with respect to the second holder therethrough.

3 Claims, 20 Drawing Sheets

U.S. PATENT DOCUMENTS

| | | | |
|---|---|---|---|
| 5,234,185 A * | 8/1993 | Hoffman et al. | 248/56 |
| 5,435,506 A * | 7/1995 | Wiley | 248/74.1 |
| 5,556,138 A * | 9/1996 | Nakajima et al. | 285/124.4 |
| 5,950,970 A * | 9/1999 | Methany et al. | 248/150 |
| 6,481,756 B1 * | 11/2002 | Field et al. | 285/124.1 |
| 6,528,728 B1 * | 3/2003 | Shima | 174/101 |
| 6,802,512 B2 * | 10/2004 | Muller et al. | 277/607 |
| 6,868,580 B1 * | 3/2005 | Diggs | 16/2.1 |
| 6,977,340 B2 * | 12/2005 | Nakamrura | 174/667 |

FOREIGN PATENT DOCUMENTS

| | | |
|---|---|---|
| JP | 62-14630 U | 1/1987 |
| JP | 64-45420 U | 3/1989 |
| JP | 06-36932 U | 5/1994 |
| JP | 2001-245425 A | 9/2001 |

OTHER PUBLICATIONS

Japanese Patent 6-36931, along with a machine generated translation Date: Jun. 17, 1994.

* cited by examiner a-a section b-b section

THROUGH-PANEL FIXING DEVICE FOR PIPING MEMBER

BACKGROUND OF THE INVENTION

The present invention relates to a fixing device and a holder for mounting or securely fixing a fuel conveying piping member or other piping member, for example, in a frame of a motor vehicle or in other panel, specifically to a fixing device for mounting or securely fixing the piping member in and through a pair of panels spaced apart from one another, and a holder adaptable for the fixing device.

Since the past, a fixing device as shown in FIGS. 18 (A), (B) and (C) has been adapted to mount or securely fix a fuel conveying piping member or other piping member to a panel, for example, of a motor vehicle.

In FIG. 18, reference numeral 200 indicates a grommet which is an elastic body formed from elastic material such as rubber and constructs independently a fixing device. The grommet 200 is formed with a through-hole 204 in a center portion thereof for passing a piping member 202 such as a hose therethrough, and an annular groove 206 in and along an outer peripheral portion.

In the fixing device (structure) shown in FIG. 18, the piping member 202 is inserted in and through the through-hole 204 in the center portion of the grommet 200, and the annular groove 206 in the outer peripheral portion thereof is fitted elastically to or on a circumferential edge portion of a mounting hole 210 of a panel 208. Thereby the piping member 202 is fitted and mounted or fixed in and through the panel 208 by means of the grommet 200.

However, in the grommet 200 shown in FIG. 18 (A), an operator has to mount the grommet 200 in the mounting hole 210 of the panel 208 by fitting the outer peripheral portion of the grommet 200 to the mounting hole 210 while forcibly causing an elastic deformation thereof. This bothers the operator and requires a lot of time.

On the other hand, the Patent Document No. 1 below discloses a fixing device or structure for securely fixing a piping member in a panel as shown in FIG. 19.

The fixing structure as shown in FIG. 19 is adapted for connecting a plurality of piping members 202A of metal pipes simultaneously to mating piping members 202B which consist mainly of flexible hoses 202B-1. Reference numeral 211 indicates a grommet that holds the plurality of the piping members 202A through the through-holes 204.

In this fixing device, the piping members 202A are inserted in and held through the plurality of the through-holes 204 of the grommet 211. The grommet 211, while holding the piping members 202A therethrough as above, is elastically fitted in and securely fixed in a mounting hole 210 of the panel 208.

Then, a clamp member 214 is disposed on an opposite side (back side or rear surface side) of the panel 208. The clamp member 214 is formed with a plurality of positioning holes 212 therein, and uprising columns 216 thereon. The leading end portions of the piping members 202A are fitted in the plurality of the positioning holes 212 so as to be positioned in side by side relation to one another by means of the clamp member 214, and at the same time, the uprising columns 216 of the clamp member 214 abut the rear surface of the panel 208 to prevent the piping member 202A from coming off.

The mating piping members 202B to which the piping members 202A are connected have flexible hoses 202B-1 and joint tubes 202B-2 which are attached to the end portions of the flexible hoses 202B-1. These joint tubes 202B-2 are held by a holder or end member 220.

The end member 220 and the clamp member 214 are formed with internally threaded bores 222, 224, respectively. And, the end member 220 and the clamp member 214 are fastened to one another by screwing a threaded screw member 226 in the internally threaded bores 222, 224.

The piping members 202A, which extend or run through the mounting holes 210 of the panel 208 downwardly (in Fig.), are inserted also downwardly (in Fig.) in the joint tubes 202B-2 that are held by the end member 220, and thereby the plurality of the piping members 202A and the plurality of the piping members 202B are connected to one another via these joint tubes 202B-2.

However, in the fixing device shown in FIG. 19, an operator also has to mount or securely fix the piping members 202A in the panel 208 by forcibly fitting the grommet 211 in the mounting hole 210 of the panel 208 while causing an elastic deformation of the grommet 211. This also entails a problem that the operator is bothered and spend a lot of time for mounting operation of the piping members.

On the other hand, the Patent Document No. 2 below discloses that a grommet is divided perpendicular to the axis into two part bodies. The two part bodies are mated perpendicular to the axis with one another and thereby piping members are held through a plurality of through-holes formed in the grommet.

By the way, in case where a piping member is arranged and securely fixed in a predetermined position, it is occasionally required to insert and mount or securely fix a piping member in mounting holes formed in a pair of panels that are spaced apart from one another, while being through the pair of panels, respectively.

However, the conventional fixing device or structures for piping member as stated above are both constructed only to mount or securely fix a piping member in a single panel. Therefore, there is a problem that these fixing devices are not useful when a piping member is mounted or securely fixed in and through a pair of panels spaced apart from one another, respectively.

That is, in the past, there is no disclosure of fixing device for mounting or securely fixing a piping member in and through a pair of panels spaced apart from one another, respectively. Therefore, it is required to newly develop a fixing device or structure for that application.

And, in case of such conventional fixing devices, it is difficult or troublesome to insert and mount or securely fix the piping member in and through a mounting hole of a panel which is located in an inaccessible location.

[Patent Document No. 1] JP, A, 2001-200976
[Patent Document No. 2] JP, U, 6-36931

Under the circumstances described above, it is an object of the present invention, in one aspect, to provide a novel through-panel fixing device for piping member that allows a piping member to be easily mounted or fixed in and through a pair of panels spaced apart from one another, respectively, while being positioned.

And, it is an object of the present invention, in one aspect, to provide a novel holder which can be adapted in such fixing device and allows the piping member to be easily mounted or fixed in and through the mounting hole of a panel for example, that is located in an inaccessible location.

SUMMARY OF THE INVENTION

In one aspect of the present invention, there is provided a through-panel fixing device (structure) for piping member that is adapted for mounting or fixing a piping member to a pair of panels spaced apart from one another. The pair of the panels are formed with mounting holes respectively. The piping member is mounted or fixed in the pair of the panels or mounting holes through the mounting holes, respectively. The through-panel fixing device for piping member comprises a first holder that is adapted for mounting or fixing the piping member in the mounting hole formed in one panel, and a second holder that is adapted for mounting or fixing the piping member in the mounting hole formed in the other panel. Each of the first and the second holders has; a) a through-hole for k receiving the piping member therethrough, the piping member is restrained so as to be positioned perpendicular to an axis through and by the through-hole, b) a fit-in projecting portion projecting in an axial direction, the fit-in projecting portion is inserted axially and fitted in the mounting hole so as to be positioned perpendicular to the axis, and c) a resilient lug and a collar portion for cooperatively clamping or securely sandwiching the panel with its inner and outer surfaces therebetween by or when inserting axially the first or the second holder in the mounting hole. Further, the first holder holds the piping member relatively movably axially with respect to the first holder therethrough, while the second holder securely fixes the piping member axially with respect to the second holder therethrough by engagement between an axial engaging portion provided in the second holder and an engaged portion provided in the piping member.

The first and the second holders may be mounted or fixed in the mounting holes by being inserted in the corresponding mounting holes, respectively, in mutually opposite directions or in mutually opposite axial directions. The resilient lugs may be provided in the holder or the holders on opposite ends in a direction perpendicular to an axis of the piping member or the like, for example, on opposite ends in a vertical direction or widthwise direction.

The first holder and/or the second holder may have a construction to be divided in part bodies in a direction perpendicular to the axis by a parting surface extending through the through-hole. The part bodies may be mated or attached with one another or together in the direction perpendicular to the axis so as to receive the piping member through the through-hole.

The part bodies may be combined with one another or together by means of a resilient tab and a stop protrusion in the direction perpendicular to the axis. The resilient tabs and stop protrusions may be provided on opposite ends of the part bodies in the direction perpendicular to the axis, for example, on opposite ends in a vertical direction or widthwise direction thereof. The parting surface of one of the part bodies may be provided with a positioning boss and the parting surface of the part body opposed to the one of the part bodies may be provided with a positioning bore in which the positioning boss is fitted.

The first and the second holders may be provided with a plurality of through-holes respectively, so as to hold a plurality of the piping members therethrough.

The first holder may hold a flexible hose of the piping member, and the second holder may hold a joint tube of the piping member that is attached to an end portion of the hose.

Also, according to one aspect of the present invention, there is provided a novel through-panel holder for piping member that is adapted for mounting or fixing a piping member in a panel through a mounting hole formed in the panel. The through-panel holder for piping member is divided into a first part body and a second part body in the direction perpendicular to the axis, for example, of the piping member. Namely, the through-panel holder for piping member comprises the first part body and the second part body. And, a through-panel holder for piping member comprises a fit-in projecting portion having or including a piping restraining portion, and a collar portion. The fit-in projecting portion is inserted axially and fitted in the mounting hole so as to be positioned perpendicular to an axis. The piping restraining portion is formed so as to pass axially through the mounting hole. The piping restraining portion allows the piping member therethrough, and restrains the piping member so as to be positioned perpendicular to the axis therethrough. A collar portion is separable from the piping restraining portion, and connected or combined to the piping restraining portion. The collar portion restrains the piping restraining portion that is inserted axially in the mounting hole so as to be positioned axially with respect to the panel, while being connected to the piping restraining portion. For example, the piping restraining portion restrains the piping member from being readily detached perpendicular to the axis, before the collar portion or the second part body is connected thereto. Or, for example, the piping restraining portion is mounted to the piping member so as not be readily detached and/or not to be displaced in the axial direction, before the collar portion or the second part body is connected thereto. And, the piping restraining portion may be constructed so as to completely or firmly position the piping member perpendicular to the axis, when the first part body is combined with the second part body, The first part body includes a major part of the fit-in projecting portion and has the piping restraining portion. Also, the second part body includes a minor part of the fit-in projecting portion and integrally has the collar portion. Here, the piping member may be formed with a pair of flanges that are axially spaced apart from one another. An engaging portion of the piping restraining portion and an engaging portion of the second part body may be disposed between the pair of the flanges. With this arrangement, the engaging portion of the piping restraining portion engages with one of the flanges, the engaging portions of the second part body engages with the other of the flanges, and thereby the piping member is axially positioned.

The piping restraining portion may restrain a plurality of the piping members so as to be positioned perpendicular to the axis, respectively.

The through-panel holder for piping member may further comprise resilient lug cooperating with the collar portion to clamp or securely sandwich the panel with its inner and outer surfaces therebetween by or when inserting the fit-in projecting portion axially in the mounting hole.

As stated above, in the fixing device (structure) for piping member according to the present invention, first and second holders are used in order to mount or fix a piping member in a pair of panels which are spaced apart from one another and formed with mounting holes therein, respectively. The first and the second holders are inserted axially in the mounting holes respectively so as to be positioned (i.e., so as to be positioned perpendicular to the axis). Here, each holder has a resilient lug and a collar portion. So, through such simple operation, the panel is clamped or securely sandwiched by the resilient lug and the collar portion with its inner and outer surfaces therebetween, and each holder is mounted or fixed in each of the panels. In this construction, the first holder holds the piping member movably relatively in the axial direction, while the second holder holds the piping member in securely fixed relation with respect to the axial direction.

According to the present invention, the first holder is mounted or fixed in the mounting hole of one of the panels, and thereby the piping member, which is held in the first holder, may be also mounted or fixed in the mounting hole of the one panel so as to be positioned (so as to be positioned perpendicular to the axis) with respect to the mounting hole of the one panel.

And, similarly, the second holder is mounted or fixed in the mounting hole of the other of the panels, and thereby the piping member, which is held in the second holder, may be also mounted or fixed in the mounting hole of the other panel so as to be positioned (so as to be positioned perpendicular to the axis) with respect to the mounting hole of the other panel.

The piping member that is mounted in the mounting holes of the panels by means of the first and the second holders may be held firmly in securely fixed relation also with respect to the axial direction, by engagement between an engaging portion of the second holder and an engaged portion of the piping member.

According to the fixing device for piping member of the present invention, even in case where constraint on layout design does not allow to align the mounting holes of the panels in the direction perpendicular to the axis, or in case where accuracy variations in hole processing or panel bending process or the like makes the mounting holes of the panels misalign with one another in the direction perpendicular to the axis, the operator can mount or fix firmly the piping member in these mounting holes so as to be positioned without trouble.

Meanwhile, it is assumingly possible to employ such arrangement that an engaging portion is also formed in the first holder, and the piping member is held also in the first holder in securely fixed relation with respect to the axial direction by axial engagement between the engaging portion and corresponding engaged portions formed in the piping member. However, in this manner, for example, in such case that it is difficult to access or use a space between the panels as working clearance to mount the piping member, it bothers an operator to mount or fix the piping member in a pair of panels spaced apart from one another therethrough.

In such case, for example, the first holder, which holds the piping member therein, may be first inserted axially (for example, from an axial outer side of one of the panels) and held or fixed in the mounting hole of the one of the panels, and then the second holder, which also holds the piping member therein, may be inserted in an opposite direction of an inserting direction of the first holder (for example, from an axial outer side of the other of the panels) and held or fixed in the mounting hole of the other of the panels. This arranging manner is convenient when the piping member is mounted or securely fixed in the mounting holes of the pair of the panels spaced apart with one another therethrough, respectively.

Here, first, the piping member is pulled for a certain length from the mounting hole of the other panel, and the piping member is held in the second holder while the engaging portion of the second holder engages with the engaged portions of the piping member in the axial direction. In this state, the second holder is inserted and securely fixed in the mounting hole of the other panel. Thereby, the piping member is held in the mounting holes of the pair of the panels in mounted or securely fixed relation by means of the pair of holders. In that case, if the piping member is held in the first holder in fixed relation with respect to the axial direction, the piping member is not allowed to be pulled out for a certain length from the mounting hole of the other panel when an operator tries to mount the piping member in the mounting hole of the other panel by means of the second holder. As a result, the operator cannot favorably fix the piping member in the panel by means of the second holder.

Or, on the contrary, there might be a case where the piping member is first mounted or securely fixed in the mounting hole of the other panel by means of the second holder and then the piping member is mounted in the mounting hole of the one panel by means of the first holder. Similarly, here, if the first holder holds the piping member in the fixed relation with respect to the axial direction, it is difficult for an operator to insert axially and mount such first holder in the mounting hole of the one panel.

In the fixing device for piping member according to the present invention, the first holder holds the piping member movably relatively in the axial direction. Even if there is a difficulty to access or use a space between the pair of the panels as working clearance, this arrangement allows to mount or fix the piping member in the mounting holes of the pair of the panels, respectively, by means of the pair of the first and the second holders through a simple operation without trouble.

In the fixing device for piping member according to the present invention, even if a distance accuracy is low between the pair of the panels, the piping member can be mounted in the panels.

As stated, the fixing device for piping member according to the present invention is specifically and preferably applied in case that the space between the panels is not accessible or available as working clearance. However, the fixing device for piping member of the present invention is applied necessarily not only in such case, but also in case where the space between the panels is available as working clearance. In the latter case, an operator can easily mount or securely fix the piping member in the mounting holes of the pair of the panels in a simple operation, through the panels, for example, in firmly fixed relation with respect to both the axial direction and the direction perpendicular to the axis.

Further, according to the present invention, the first holder and/or the second holder may have a construction to be divided in part bodies (for example, two part bodies) in the direction perpendicular to the axis by a parting surface extending through the through-hole. The part bodies or the two part bodies may be mated with one another or together in the direction perpendicular to the axis so as to receive or hold the piping member through the through-hole. The piping member can be easily held by the holder when the holder has a plural-part construction or two-part construction.

For example, an resilient tab may be provided in one of the part or two part bodies (for example, one proximal half body 22-2, the other distal part body 24-2 in FIG. 1), and a stop protrusion may be provided in the part body opposed to the one of the part bodies or the other of the two part bodies (for example, the other proximal half body 22-1, one distal part body 24-1 in FIG. 1). The part or two part bodies may be combined with one another or together by means of the resilient tab and the stop protrusion in the direction perpendicular to the axis.

In this arrangement, the part or two part bodies may be combined automatically with one another or together in the direction perpendicular to the axis just by mating the part or two part bodies with one another or together.

According to the present invention, the plurality of through-holes may be provided in the first and the second holders respectively. This arrangement allows to hold the plurality of the piping members simultaneously through the through-holes so as to be positioned.

In the present invention, the first holder may hold a flexible hose of the piping member, and the second holder may hold a joint tube of the piping member which is attached to an end portion of the hose.

According to the through-panel holder for piping member of the present invention, a piping member may be passed axially along with the piping restraining portion in or through the mounting hole of the panel, for example, in an inaccessible location, while the piping restraining portion is mounted thereto or thereon. Here, for example, the first part body is formed so as to pass axially through the mounting hole of the panel. And, for example, the first part body is constructed as piping restraining portion.

Then, the piping restraining portion, which is mounted to the piping member, is pulled out for a certain length in an opposite direction of an inserting side of the piping member, and then the collar portion is combined to the piping restraining portion or the first part body, and then the piping restraining portion is pushed back in the mounting hole. Thereby the holder, which is divided into the piping restraining portion and the collar portion, may be mounted or securely fixed in the panel along with the piping member.

Conventionally, a piping member is first inserted in a mounting hole of a panel separately, and an entire holder is mounted to the piping member on the opposite side of the piping member insertion side. Then, the piping member is mounted or securely fixed in the panel by means of the holder. However, according to the present invention, assembling process step may be saved after the piping member is inserted in the mounting hole, thereby the piping member may be easily mounted in the panel.

The above through-panel holder for piping member is provided with a fit-in projecting portion that is inserted and fitted in the mounting hole so as to be positioned perpendicular to the axis. Also, the holder has a construction to be divided in a first part body and a second part body. The first part body includes a major part of the fit-in projecting portion, while the second part body includes a minor part of the fit-in projecting portion. The piping restraining portion is constructed by the first part body and a collar portion is formed integrally in the second part body.

According to the through-panel holder for piping member of the present invention, a plurality of the piping members may be passed in the mounting hole of the panel along with the piping restraining portion, for example, located in an inaccessible location, while being restrained in the piping restraining portion. Here, the piping members may be also held in or by the piping restraining portion so as not to be readily detached perpendicular to the axis. Then, the collar portion or the second part body is combined with the piping restraining portion or the first part body, the piping restraining portion is pushed back in the mounting hole from an opposite side of the inserting side, thereby the holder and the piping members are mounted or securely fixed in the panel.

According to this through-panel holder for piping member, the plurality of the piping members may be assembled preparedly with the piping restraining portion to construct a partial piping assembly. Then, this piping assembly may be inserted in the mounting hole, that is, the plurality of the piping members may be inserted together therein while being positioned in side by side relation to one another. It facilitates easy operation to insert the piping members in the mounting holes compared to the case that the plurality of the piping members are inserted therein separately.

Therefore, there will not be such problem that an operator cannot successfully insert in the mounting hole the piping members that are not restrained in side by side relation, or the piping members are damaged due to that reason during the piping members are inserted therein.

Meanwhile, when the plurality of the piping members are separately inserted in the mounting hole and an entire holder is mounted to the piping members on the opposite side of the piping member insertion side, additional assembling process step is required for mounting operation. However, according to one aspect of the present invention, the piping restraining portion is first mounted to the piping members, and then the piping member is inserted in the mounting hole. This saves following assembling process step.

If the entire holder is mounted or assembled to the piping member or piping members prior to passing the holder in the mounting hole, the holder and the piping member cannot be passed in the mounting hole.

Further, according to the present invention, an resilient lug may be provided on the holder so as to cooperate with a collar portion to clamp or securely sandwich the panel with its inner and outer surfaces therebetween by or when inserting the fit-in projecting portion axially in the mounting hole or mounting the holder in the mounting hole.

The wording "position" (including inflected forms such as "positioned") means, for example, "not movable" and "hardly movable".

Now, the preferred embodiments of the present invention will be described in detail with reference to the drawings.

BRIEF DESCRIPTION OF THE DRAWINGS

FIG. 3 (B) is another perspective view showing the proximal holder independently according to the embodiment.

FIG. 8 (B) is a sectional view taken along b-b line of FIG. 7.

FIG. 9 (B) is another perspective view showing the distal holder independently according to the embodiment.

FIG. 15 (B) is a sectional view showing a state that the joint tube is held in the distal holder according to the embodiment.

FIG. 16 (B) is an explanatory view of the process of mounting or securely fixing the piping members according to the present invention in the panels and showing a state that the piping members are inserted in the mounting holes of the panels.

FIG. 17 (B) is an explanatory view of a procedure following FIG. 17 (A) and showing a state that the distal holder is mounted in the mounting hole of the panel.

FIG. 18 (B) is a sectional view showing a state that a grommet is mounted in a panel.

FIG. 18 (C) is another sectional view showing a state that the grommet is mounted in the panel.

DETAILED DESCRIPTIONS OF PREFERRED EMBODIMENTS

Figure 1:
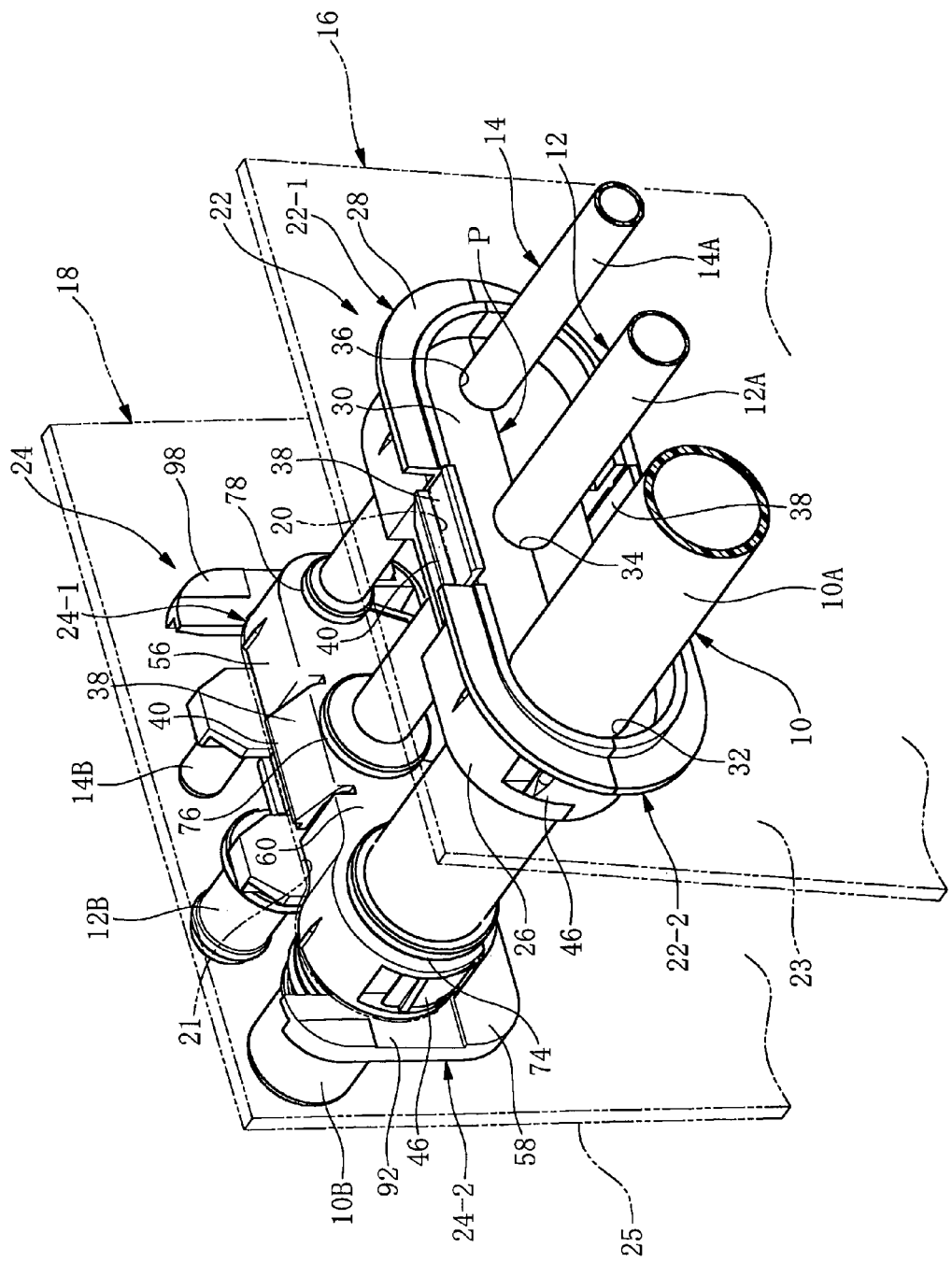
FIG. 1 is a perspective view showing proximal and distal holders of a fixing device according to one embodiment of the present invention, along with piping members and panels.

In FIG. 1, reference numerals 10, 12, 14 indicate piping members. These three piping members 10, 12, 14 have flexible hoses 10A, 12A, 14A and joint tubes 10B, 12B, 14B which are made of rigid resin pipes and attached to end portions of the hoses 10A, 12A, 14A, respectively.

Figure 2:
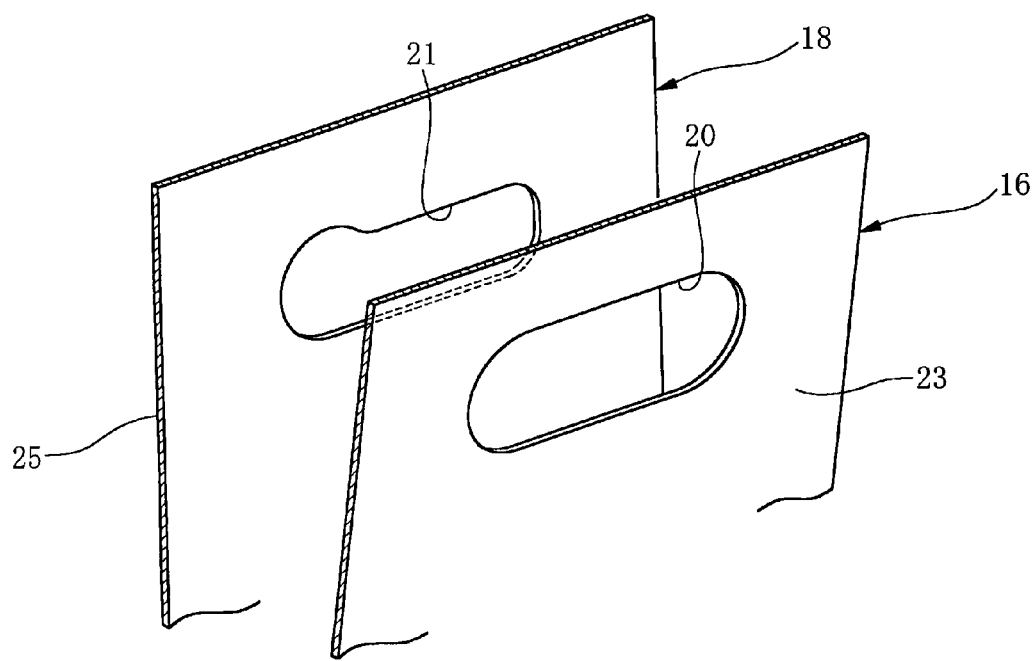
FIG. 2 is a perspective view showing the panels independently according to the embodiment.

Reference numerals 16, 18 indicate a pair of metal panels (panels for a motor vehicle here) and the piping members 10, 12, 14 are mounted or fixed to and through the pair of the panels. As shown in FIG. 2, the pair of the panels are spaced apart from one another and formed with mounting holes 20, 21 respectively, through which the piping members 10, 12, 14 extend or run.

In this embodiment, each of the piping members 10, 12, 14 is mounted or fixed in the mounting hole 20 of one panel or proximal panel 16 by means of a proximal holder (first holder) 22 made of resin, and further is mounted or fixed in the mounting hole 21 of the other panel or distal panel 18 by means of a distal holder (second holder) 24 made of resin, as shown in FIG. 1. The proximal holder 22 is "a holder to be arranged or mounted on one end portion of an object (a part of each piping member 10, 12, 14 extending from the one panel 16 and the other panel 18) and the distal holder 24 is "a holder to be arranged or mounted on the other end portion thereof".

Figure 3A:
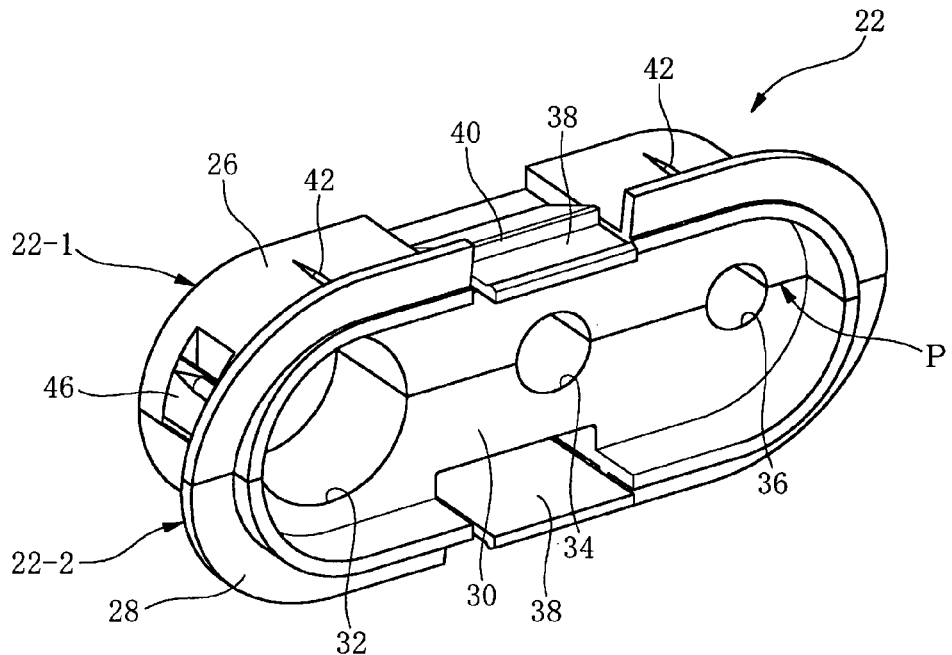
FIG. 3 (A) is a perspective view showing the proximal holder independently according to the embodiment.
Figure 3B:
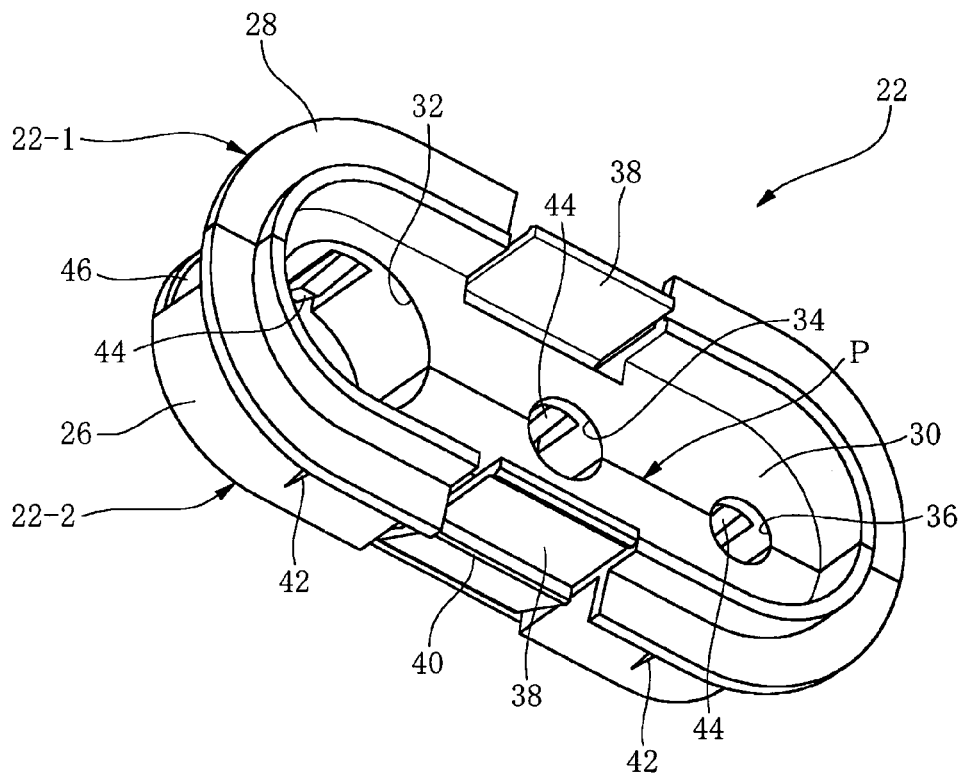

The proximal holder 22 has a planar shape of an oblong circle or ellipse corresponding to the mounting hole 20 in the panel 16 as shown in FIG. 3.

The proximal holder 22 has a proximal cylindrical portion (fit-in projecting portion) 26 projecting in an axial direction, for example, an axial direction of the piping members 10, 12, 14, a generally annular proximal flange portion (collar portion) 28 formed along an outer peripheral surface of the proximal cylindrical portion 26 and a proximal holding portion (fit-in projecting portion) 30 for holding the piping members 10, 12, 14, respectively, more specifically the flexible hoses 10A, 12A, 14A in the piping members 10, 12, 14. The proximal cylindrical portion 26 is inserted axially in the mounting hole 20 of the panel 16 and fitted therein so as to be positioned perpendicular to the axis.

The proximal holding portion 30 is formed with three proximal through-holes 32, 34, 36 corresponding to the piping members 10, 12, 14, respectively. "The proximal cylindrical portion 26", "the proximal cylindrical portion 26 and the proximal holding portion 30" or "the proximal cylindrical portion 26, the proximal holding portion 30 and the proximal through-holes 32, 34, 36" constitute the fit-in projecting portion.

These proximal through-holes 32, 34, 36 receive the hoses 10A, 12A, 14A of the piping members 10, 12, 14 therethrough, and restrain them so as to be positioned perpendicular to the axis therethrough.

The proximal through-holes 32, 34, 36 are provided with resilient retainers 44 in inner peripheral surfaces thereof respectively, as shown in FIGS. 5, 6, 7 and 8 (B). The resilient retainers 44 elastically retain the hoses 10A, 12A, 14A which are inserted or received through the proximal through-holes 32, 34, 36, and thereby the hoses 10A, 12A, 14A are prevented from rattling in the proximal through-holes 32, 34, 36, respectively.

The proximal holder 22 is provided with a pair of resilient or elastic lugs 38 in opposed relation to one another on upper and lower portions thereof in Fig.

These resilient lugs 38 are elastically deformable perpendicular to the axis, and each integrally includes a detent 40 with acute-angled extremity.

Here the detents 40 are formed in different axial positions with respect to the proximal flange portion 28, respectively.

These resilient lugs 38 work as follows.

The proximal holder 22, specifically the proximal cylindrical portion 26 is inserted axially into the mounting hole 20 of the panel 16 from the side of the outer surface 23 in FIGS. 1 and 2. In the course of insertion, the pair of the resilient lugs 38 are elastically deformed in a direction approaching each other.

When the proximal flange portion 28 abuts the outer surface 23 of the panel 16 and the detents 40 pass inside the panel 16, elastically deformed resilient lugs 38 are outwardly opened under restoring force while the detents 40 engage with an inner surface of the panel 16. The proximal flange portion 28 which abuts the outer surface 23 and the detents 40 of the resilient lugs 38 cooperatively clamp or securely sandwich the panel 16 with its inner and outer surfaces therebetween, and thereby the proximal holder 22 is mounted or fixed in the mounting hole 20 so as to be positioned both in the axial direction and the direction perpendicular to the axis.

Meanwhile, the proximal cylindrical portion 26 of the proximal holder 22 is formed with rib like raised portions or raised ribs 42 on and along an outer peripheral surface thereof, in properly spaced relation from one another.

These raised ribs 42 are fitted in the mounting hole 20 in slightly deformed state, and penetrate clearance gap between the proximal cylindrical portion 26 and the mounting hole 20 resulted from tolerance. The raised ribs 42 serve to hold and fix the proximal holder 22 in the mounting hole 20 without rattling.

As shown in FIGS. 3, 4, 5 and 6, the proximal holder 22 may be divided into two part bodies in a direction perpendicular to the axis, and comprises two halves or two half bodies halved or generally halved by a parting surface P which extends through the proximal through-holes 32, 34, 36 on a vertical center in the Figs, i.e., proximal half bodies 22-1, 22-2.

One proximal half body 22-2 is formed with a pair of elastic or resilient tabs or hook portions 46, while the other proximal half body 22-1 is formed with corresponding stop protrusions or raised stops 48, to combine the proximal half bodies 22-1, 22-2 with one another.

Figure 7:
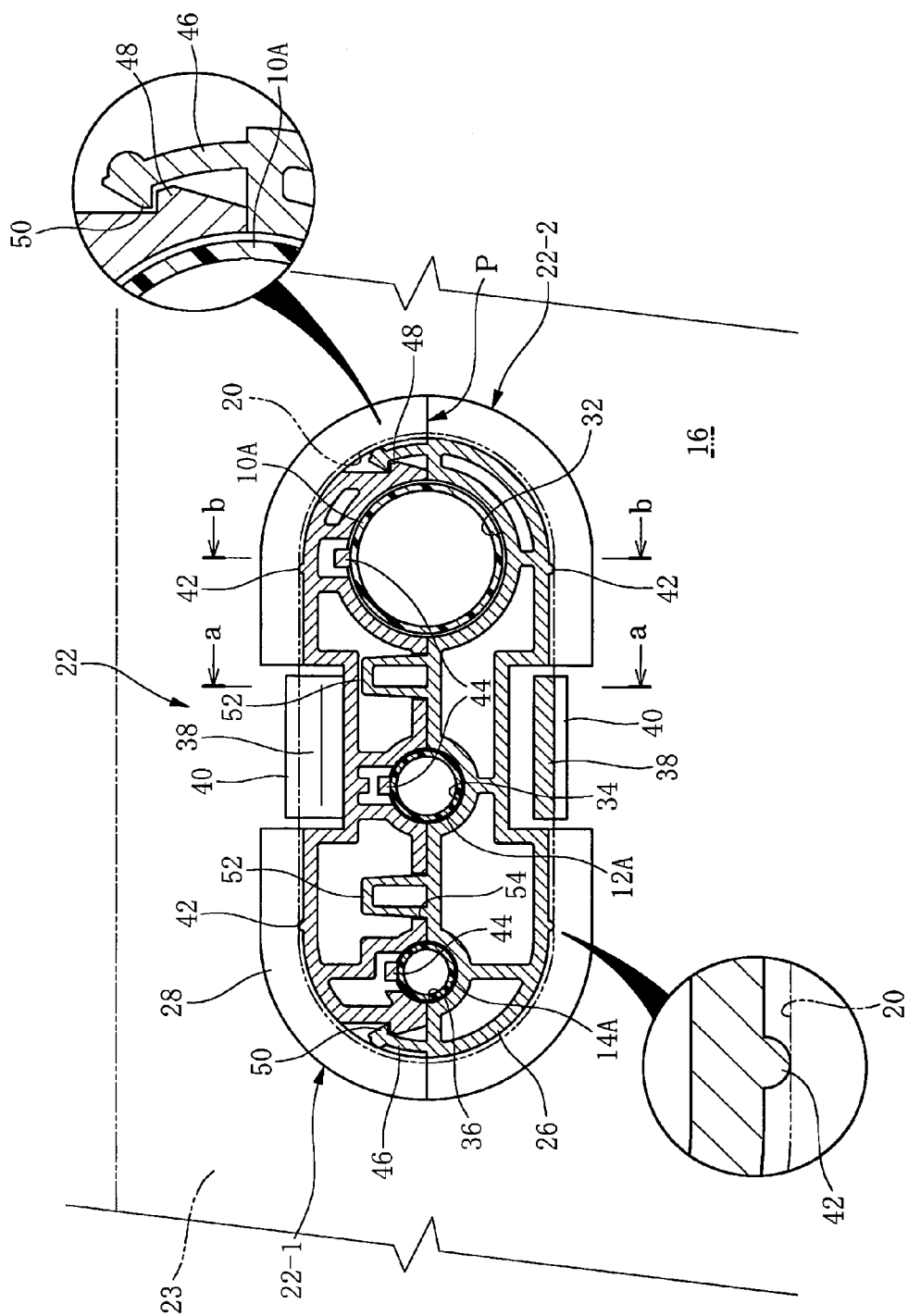
FIG. 7 is a front sectional view showing half bodies which are mated with one another to construct the proximal holder according to the embodiment, along with enlarged relevant portions.
Figure 8A:
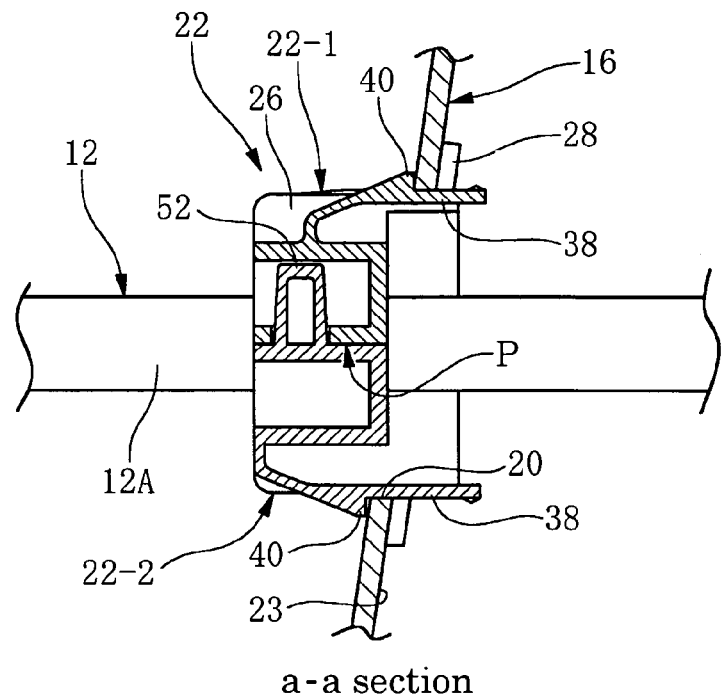
FIG. 8 (A) is a sectional view taken along a-a line of FIG. 7.
Figure 8B:
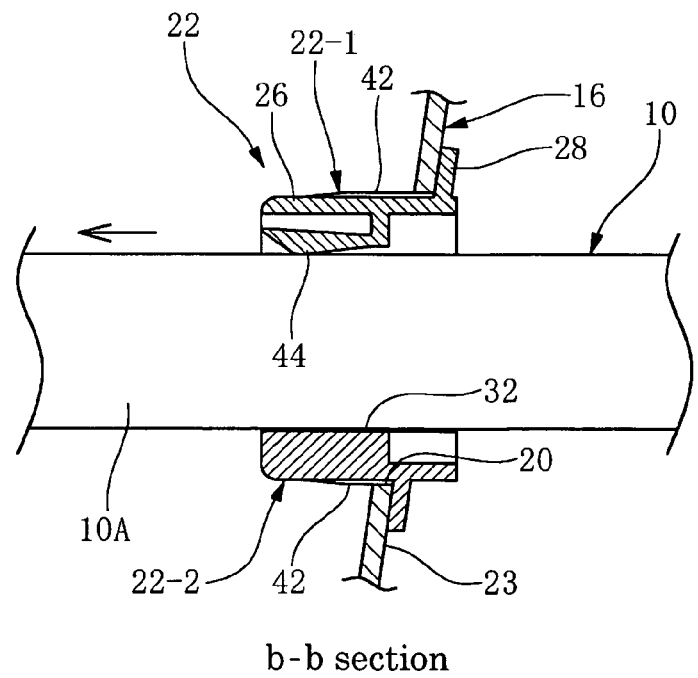

The resilient hook portion 46 integrally has a hook 50 with acute-angled tip. As shown in FIG. 7, when the pair of the proximal half bodies 22-1, 22-2 are mated with one another perpendicular to the axis, the hooks 50 of the pair of resilient hook portions 46 on the one proximal half body 22-2 are resiliently hooked with the raised stops 48 on the other proximal half body 22-1, and thereby the proximal half bodies 22-1, 22-2 are combined with each other in the direction perpendicular to the axis.

Meanwhile, the one proximal half body 22-2 is formed with a pair of positioning bosses 52, while the other proximal half body 22-1 is formed with a pair of corresponding positioning bores 54. When the proximal half bodies 22-1, 22-2 are mated with one another, fit-in relation between the positioning bosses 52 and the positioning bores 54 positions the proximal half bodies 22-1, 22-2 each other.

Figure 5:
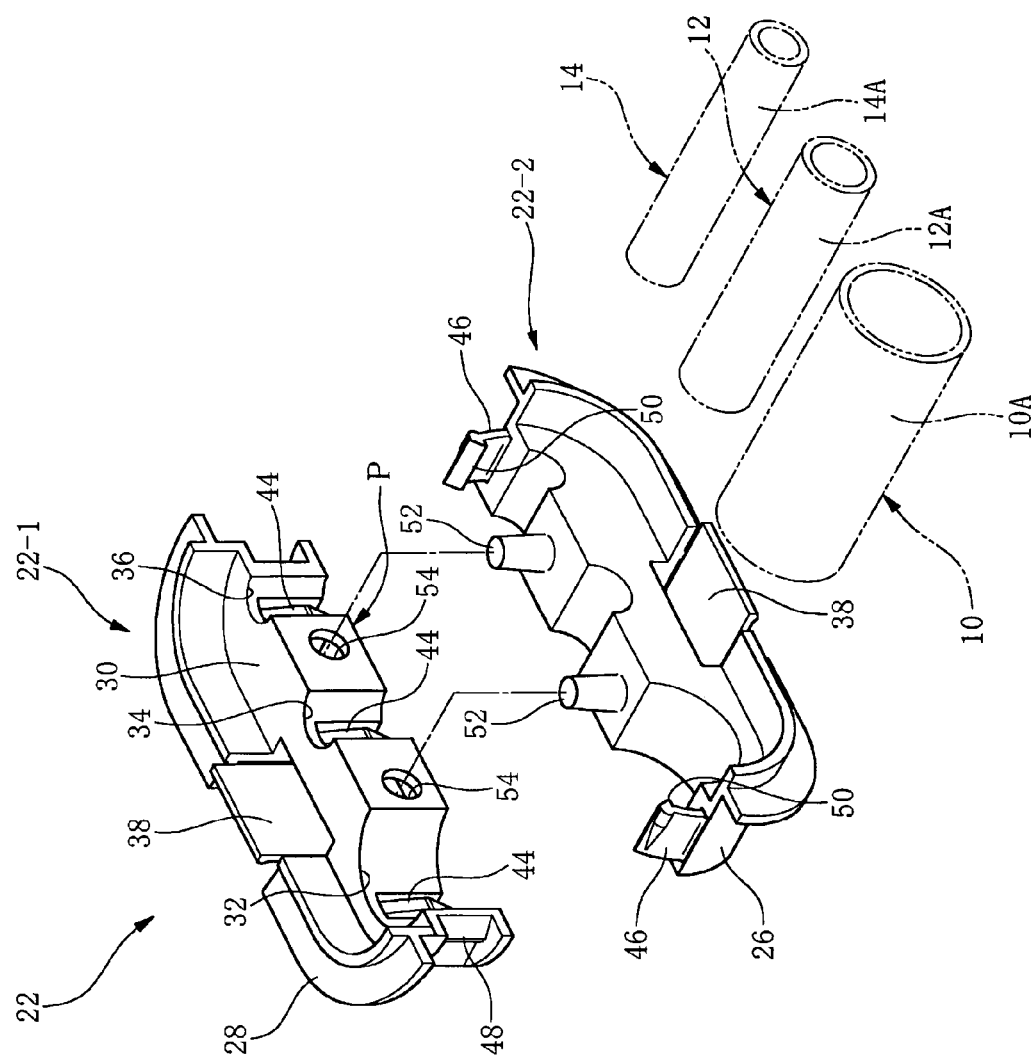
FIG. 5 is an exploded perspective view showing the proximal holder according to the embodiment, along with flexible hoses of piping members.
Figure 6:
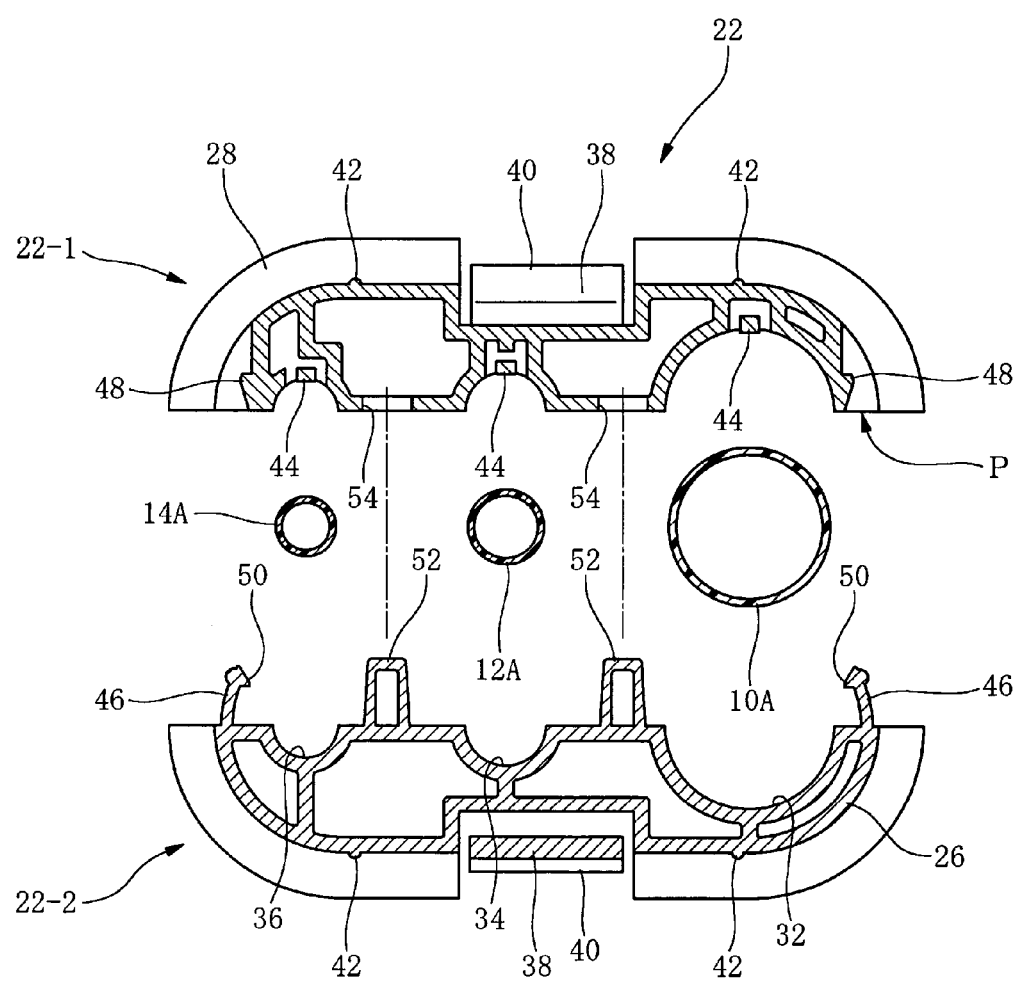
FIG. 6 is an exploded, front sectional view showing the proximal holder according to the embodiment.

In this embodiment, as shown in FIGS. 5 and 6, when a pair of the proximal half bodies 22-1, 22-2 are mated with one another in the direction perpendicular to the axis and combined with one another, the hoses 10A, 12A, 14A are simultaneously arranged through the proximal through-holes 32, 34, 36 respectively, and restrained and held so as to be positioned perpendicular to the axis, respectively.

The above mentioned distal holder 24 is to hold rigid resin joint tubes 10B, 12B, 14B shaped like pipe on end portions of the piping members 10, 12, 14.

Figure 11:
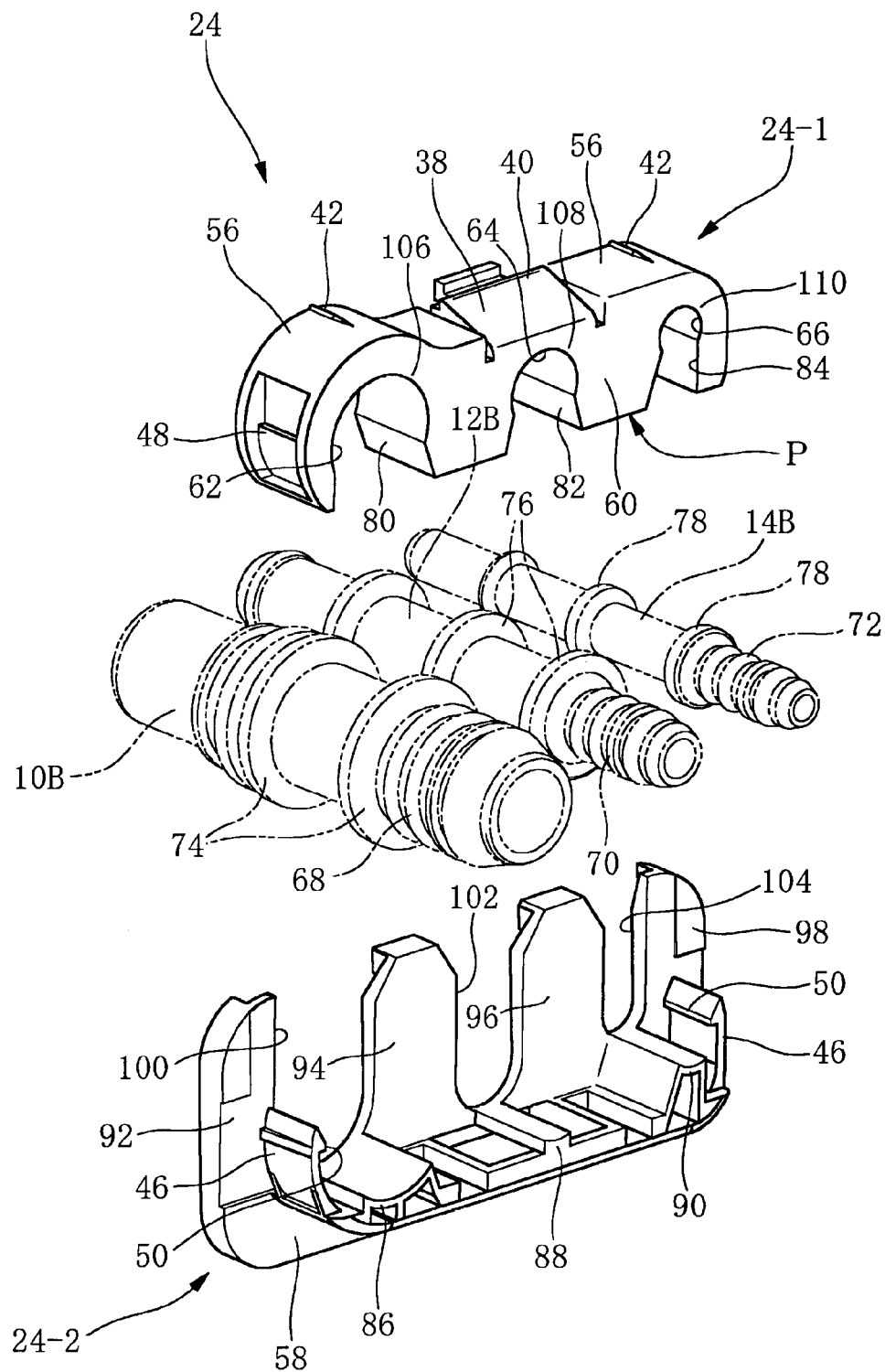
FIG. 11 is an exploded, perspective view showing the distal holder according to the embodiment, along with joint tubes of the piping members.
Figure 14:
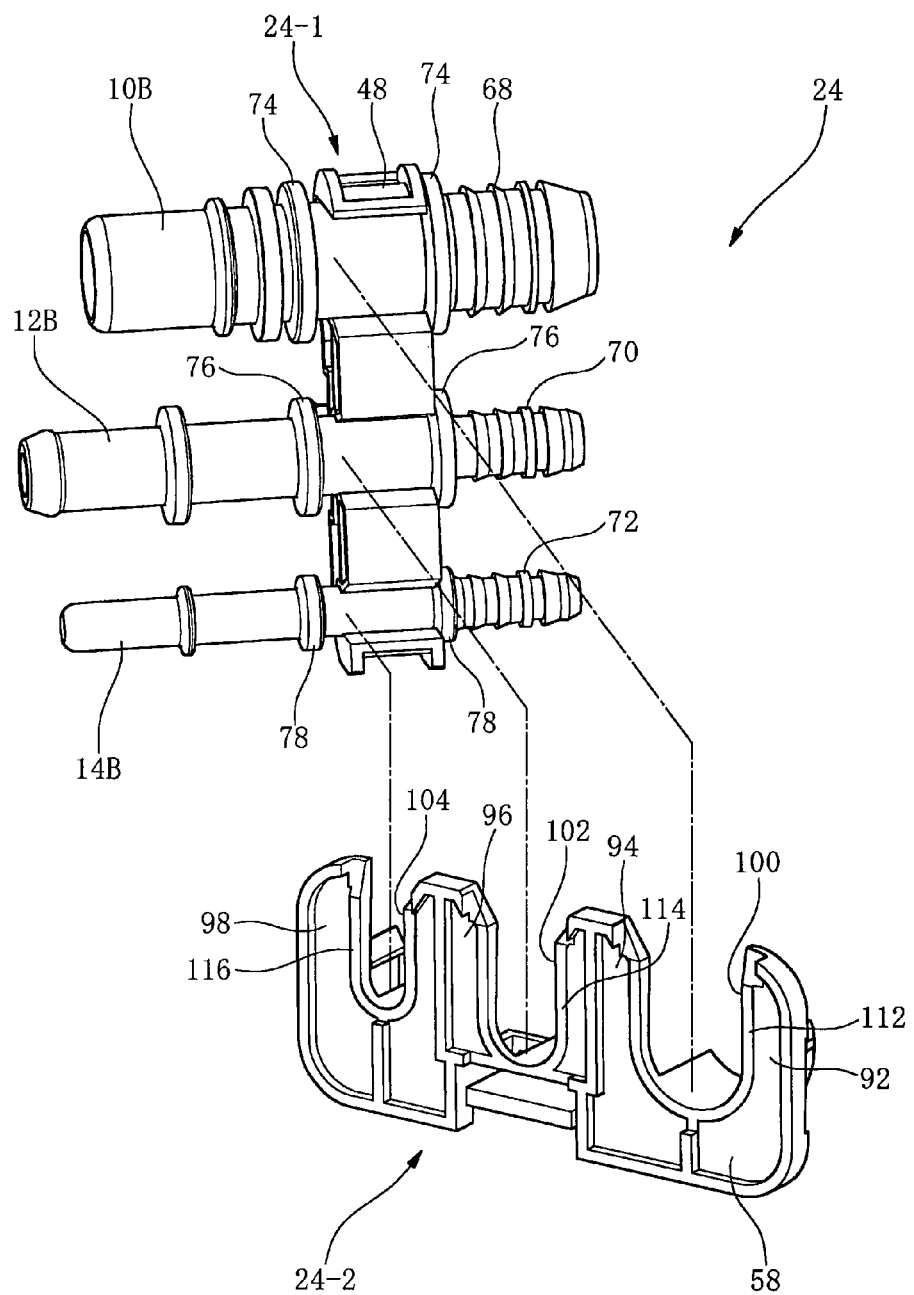
FIG. 14 is an explanatory view of process of holding the joint tubes in the distal holder according to the embodiment.

Here, as shown in FIGS. 11 and 14, the joint tubes 10B, 12B, 14B include nipple portions 68, 70, 72 on end portions thereof, respectively. The nipple portions 68, 70, 72 are relatively force-fitted in the corresponding flexible hoses 10A, 12A, 14A and thereby the joint tubes 10B, 12B, 14B are connected to the flexible hoses 10A, 12A, 14A, respectively.

Here, the nipple portions 68, 70, 72 are provided with a plurality of annular projections including outer peripheral edge portions shaped saw tooth in cross-section, axially spaced apart, respectively. While the nipple portions 68, 70, 72 are relatively force-fitted in the hoses 10A, 12A, 14A, these annular projections bite in inner surfaces of the hoses 10A, 12A, 14A to prevent the hoses 10A, 12A, 14A from coming off.

The joint tubes 10B, 12B, 14B are provided integrally with a pair of flanges (engaged portions) 74, 76, 78, respectively. The flanges 74, 76, 78 serve as engaged portions to be engaged axially with the distal holder 24.

The flanges 74, 76, 78 serve to securely fix the joint tubes 10B, 12B, 14B in the axial direction with respect to the distal holder 24, respectively, by engaging axially with engaging portions 106, 108, 110, 112, 114, 116, of the distal holder 24 which will be described later.

Figure 9A:
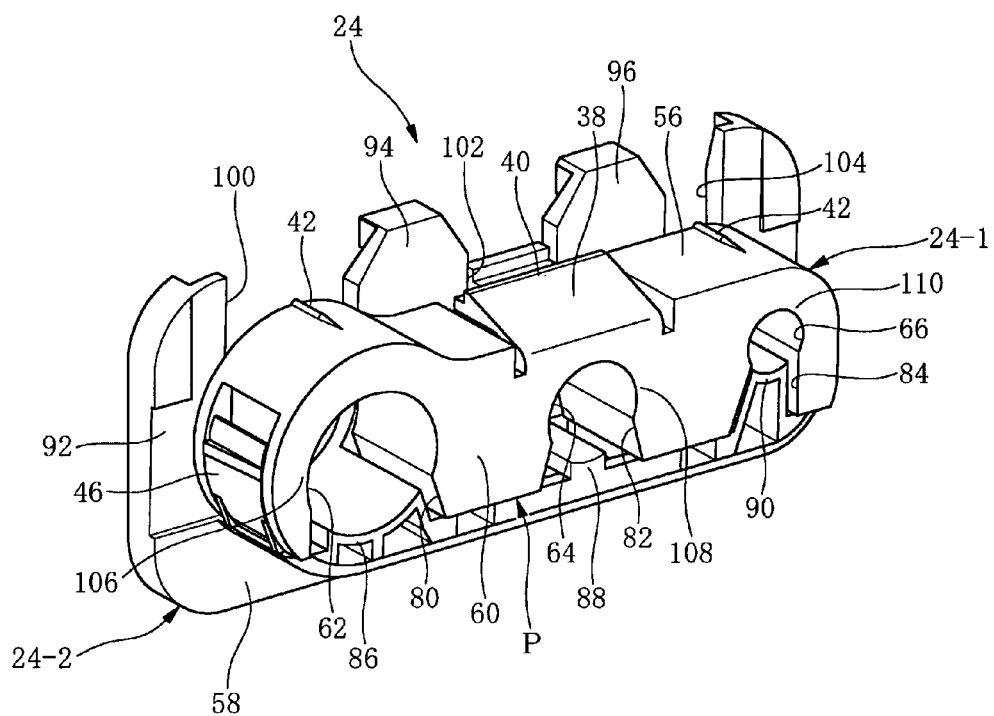
FIG. 9 (A) is a perspective view showing the distal holder independently according to the embodiment.
Figure 9B:
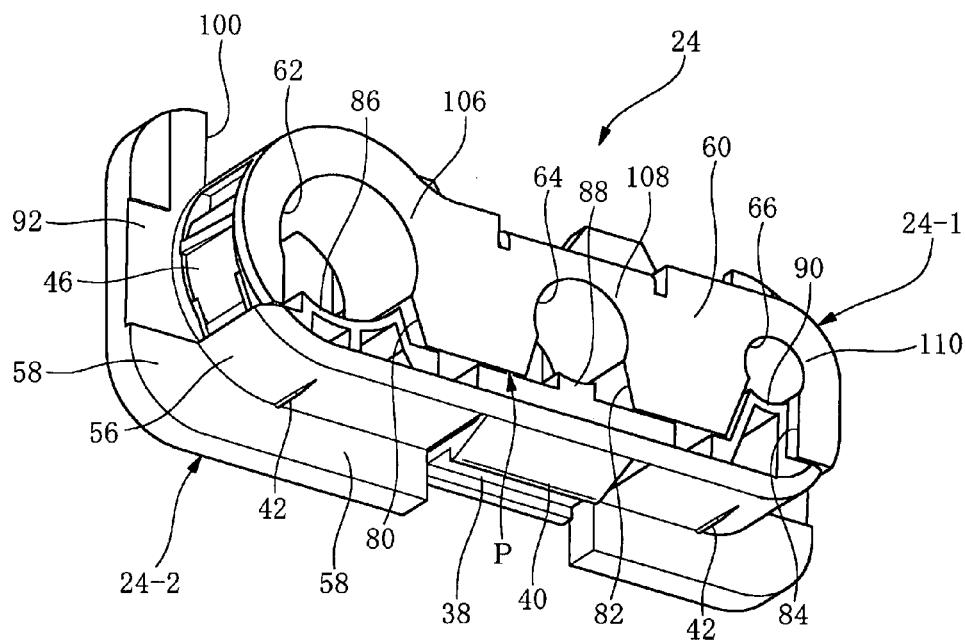

FIGS. 9 (A) and 9 (B) show whole images of the above mentioned distal holder 24.

As shown in FIGS. 9 (A) and 9 (B), the distal holder 24 has a distal cylindrical portion (fit-in projecting portion) 56 projecting in the axial direction, a distal flange portion (collar portion) 58 arranged along an outer peripheral surface of the distal cylindrical portion 56, and a distal holding portion (fit-in projecting portion) 60 for holding the joint tubes 10B, 12B, 14B, respectively. The distal cylindrical portion 56 is inserted axially and fitted in the mounting hole 21 in the panel 18 so as to be positioned perpendicular to the axis.

The distal holder 24 are also formed with three distal through-holes 62, 64, 66 in the distal holding portion 60. The distal through-holes 62, 64, 66 serve to hold and restrain the three joint tubes 10B, 12B, 14B through the distal through-holes 62, 64, 66 so as to position the joint tubes 10B, 12B, 14B perpendicular to the axis.

The distal holder 24 is also provided with a pair of the resilient lugs 38 in upper and lower portions thereof. The detents 40 of the resilient lugs 38 and the distal flange portion 58 also cooperatively clamp or securely sandwich the panel 18 with its inner and outer surfaces therebetween.

That is, the distal holder 24 is also securely fixed or mounted in the mounting hole 21 of the panel 18, while the panel 18 is clamped or securely sandwiched by the resilient lugs 38 and the distal flange portion 58.

However, the distal holder 24 is securely fixed in the mounting hole 21 of the panel 18 by being inserted therein in the opposite direction of an inserting direction of the proximal holder 22. Specifically, the distal holder 24 is inserted in the mounting hole 21 from the side of the outer surface 25 of the panel 18.

At this time, the pair of the resilient lugs 38 are elastically deformed in a direction approaching each other. When the distal flange portion 58 abuts the outer surface 25 of the panel 18 and the detents 40 of the resilient lugs 38 pass inside the panel 18, elastically deformed resilient lugs 38 are returned to their original shape or state in outwardly opening directions, the detents 40 of the resilient lugs 38 and the distal flange portion 58 cooperatively clamp or securely sandwich the panel 18 with its inner and outer surfaces therebetween, and thereby the distal holder 24 is securely fixed in the mounting hole 21 of the panel 18.

The distal holder 24 is securely and firmly fixed in the mounting hole 21 of the panel 18, while positioned perpendicular to the axis by fit-in relation between the distal cylindrical portion 56 and the mounting hole 21.

The distal cylindrical portion 56 of the distal holder 24 is also formed with rib like raised portions or raised ribs 42 on and along an outer peripheral surface thereof, in properly spaced relation from one another. These raised ribs 42 in the distal holder 24 serve the same as the raised ribs 42 in the proximal holder 22.

Figure 10:
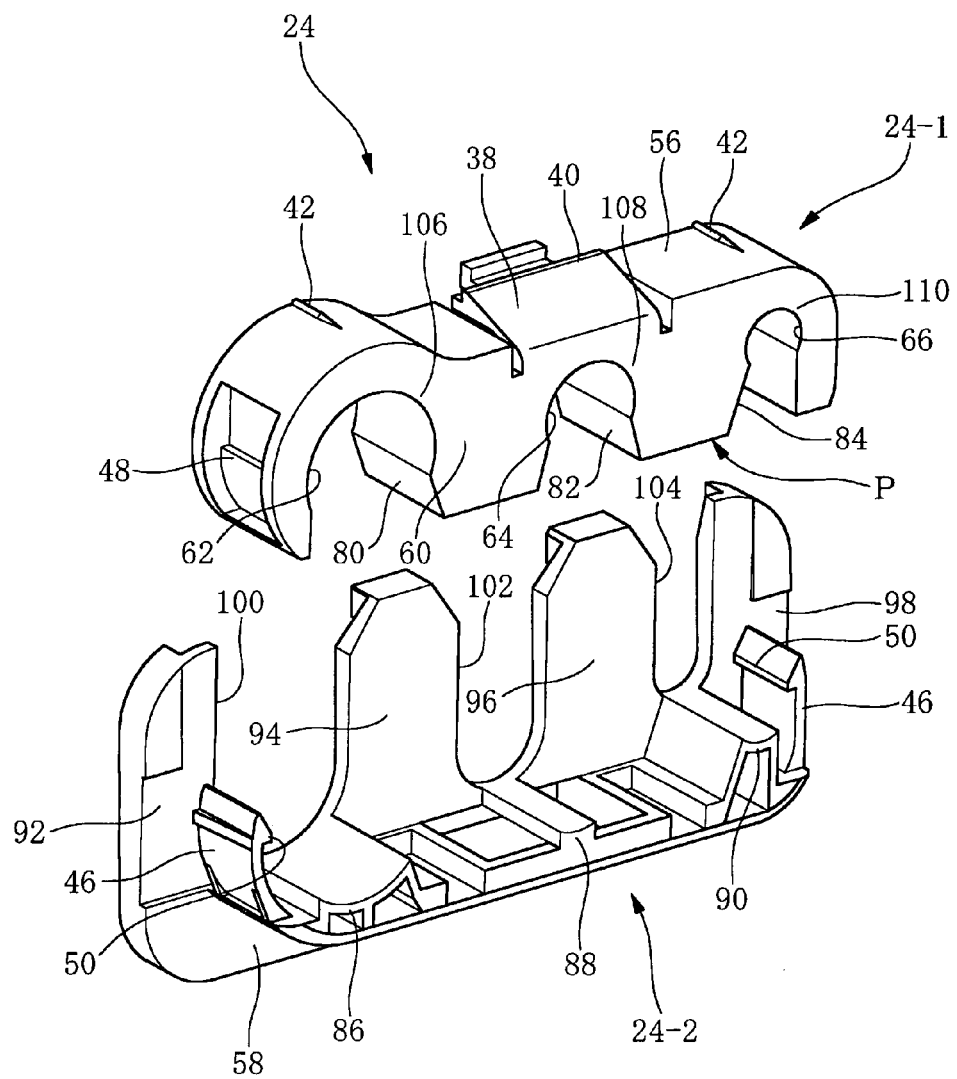
FIG. 10 is an exploded, perspective view of the distal holder of FIG. 9 (A).
Figure 12:
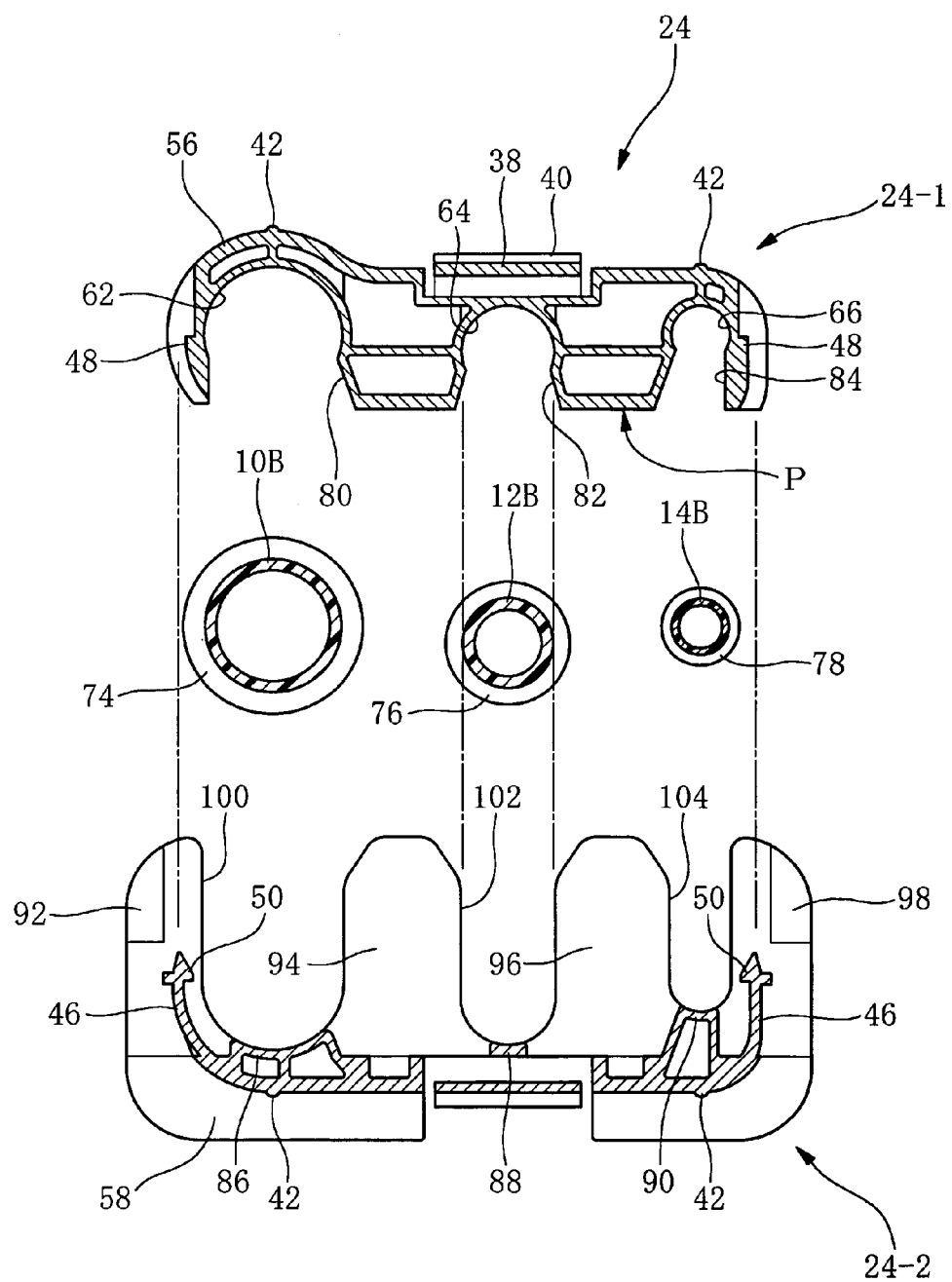
FIG. 12 is an exploded, front sectional view showing the distal holder according to the embodiment.

As shown in FIGS. 10, 11 and 12, the distal holder 24 may be also divided into two parts or two part bodies in a direction perpendicular to the axis, just like the proximal holder 22.

Figure 4:
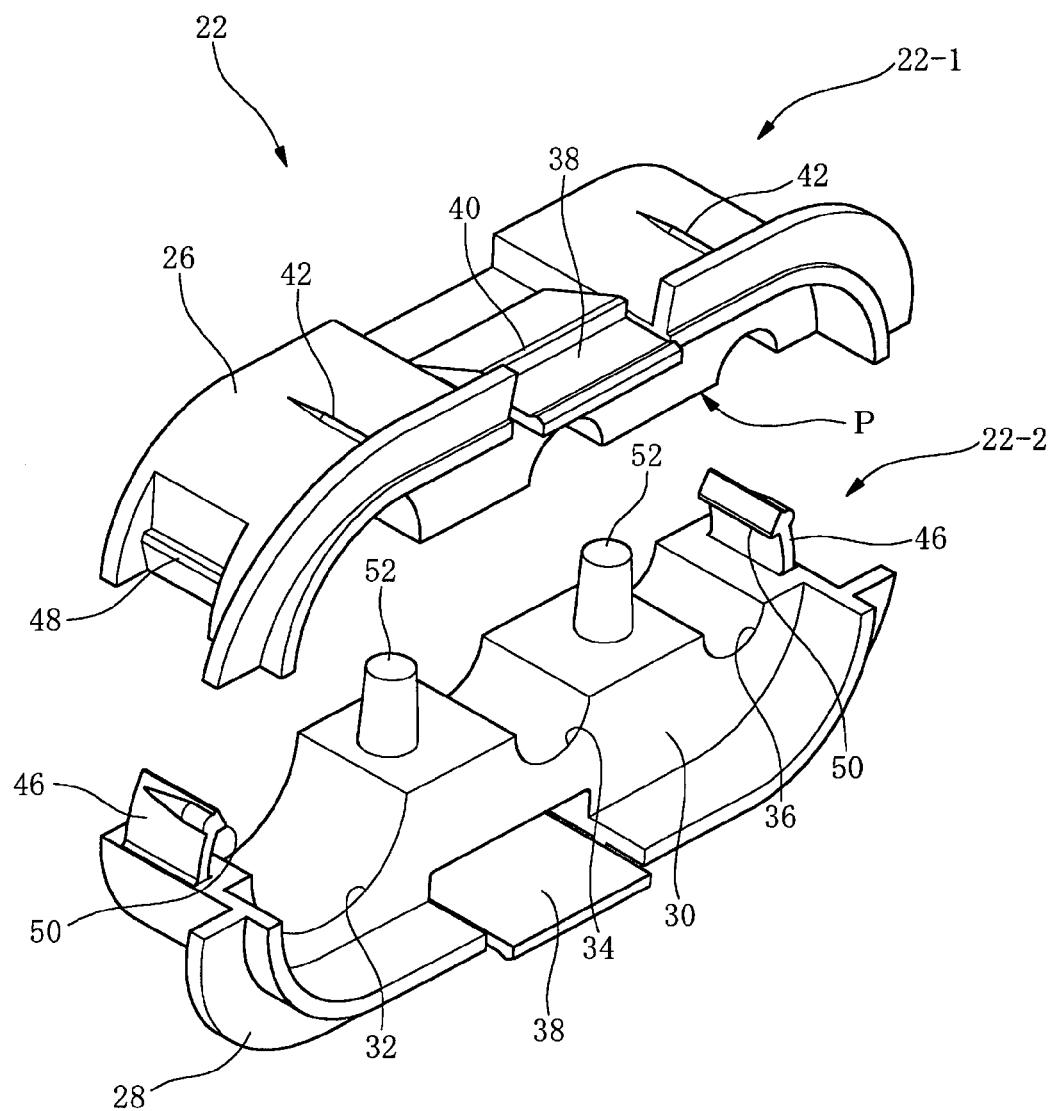
FIG. 4 is an exploded perspective view of the proximal holder of FIG. 3 (A).

However, the proximal holder 22 is divided just into two halves or two one-halves in a direction perpendicular to the axis by a flat parting surface P as shown in FIGS. 3 and 4, while the distal holder 24 is divided by a parting surface P extending through the distal through-holes 62, 64, 66, and including projections and depressions in a vertical directions in FIGS. 9 (A), (B) and 10.

In FIGS. 10, 11 and 12, reference numerals 24-1, 24-2 indicate distal part bodies of the distal holder 24.

As shown in these Figs., in the distal holder 24, the major part of the distal cylindrical portion 56, the distal holding portion 60, and the distal through-holes 62, 64, 66 is formed on a side of one distal part body (first part body) 24-1 as the piping restraining portion, and the rest part (a minor part) thereof is formed on a side of the other distal part body (second part body) 24-2. "The distal cylindrical portion 56", "the distal cylindrical portion 56 and the distal holding portion 60" or "the distal cylindrical portion 56, the distal holding portion 60 and the distal through-holes 62, 64, 66" constitute the fit-in projecting portion.

As a result, in the distal holder 24, the one distal part body 24-1 constructing the major part thereof has independently a function of restraining the piping members 10, 12, 14, specifically the joint tubes 10B, 12B and 14B in the direction perpendicular to the axis. That is, the one distal part body 24-1 serves as the piping restraining portion.

Here, the one distal part body 24-1 is allowed to pass axially through the mounting hole 21 of the panel 18 in FIG. 2.

As shown in these Figs., the one distal part body 24-1 also have guiding portions 80, 82, 84 which are continued from the distal through-holes 62, 64, 66 and open in bottom end in Fig.

These guiding portions 80, 82, 84 serve to guide the joint tubes 10B, 12B, 14B for fitting or snap-fitting in the distal through-holes 62, 64, 66 in a direction perpendicular to the axis.

Space that is defined by the guiding portions 80, 82, 84 is closed by cylinder segments 86, 88, 90 in the other distal part body 242 that construct parts of the distal through-holes 62, 64, 66, and thereby round distal through-holes 62, 64, 66 are entirely completed, respectively, when one and the other distal part bodies 241, 24-2 are mated together.

As shown in FIG. 10, the other distal part body 242 is formed integrally with resilient hook portions 46 including acute-angled hooks 50, while the one distal part body 24-1 is formed with corresponding raised stops 48.

Figure 13:
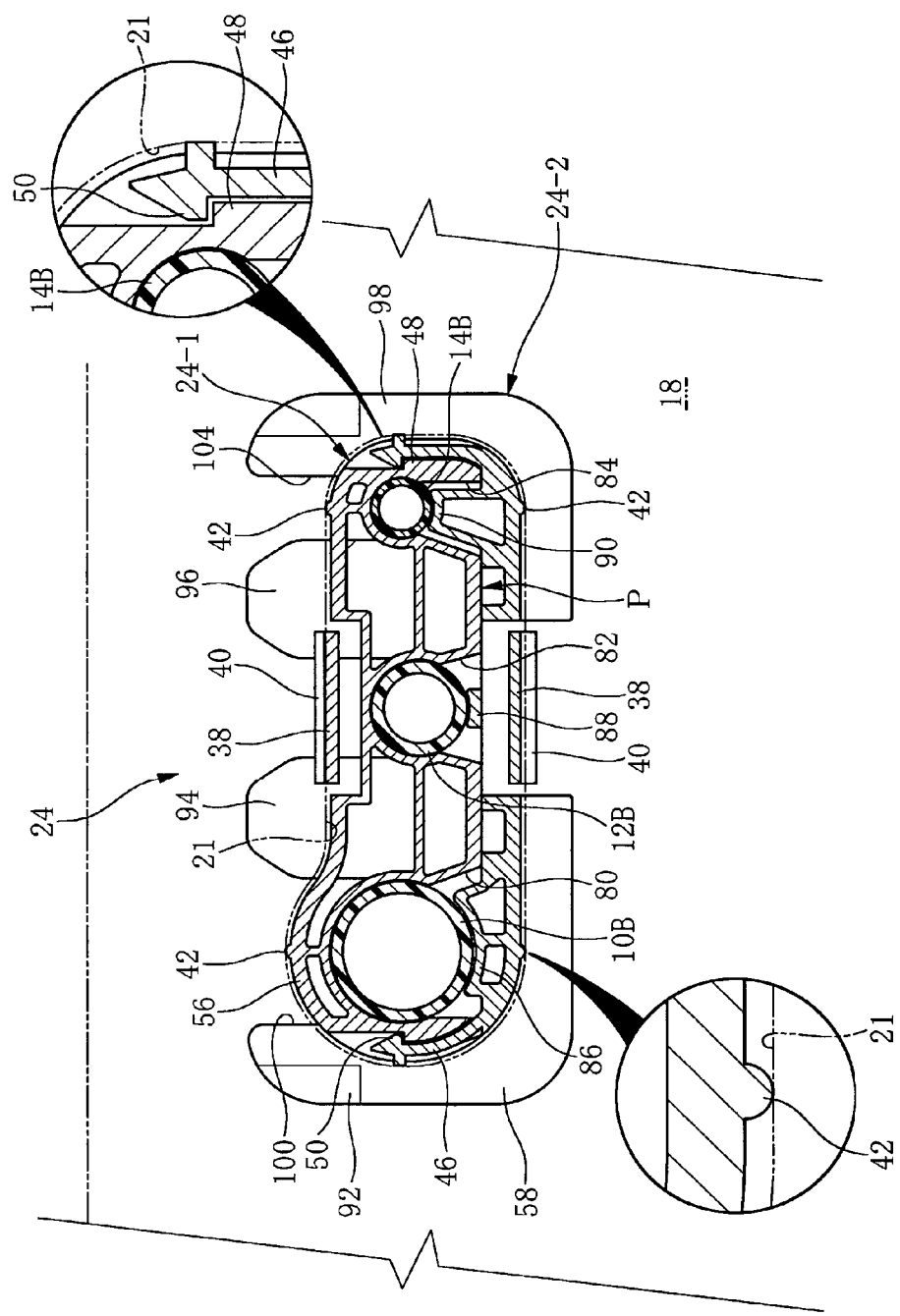
FIG. 13 is a front sectional view showing part bodies which are mated with one another to construct the distal holder according to the embodiment, along with enlarged relevant portions.

When the pair of the distal part bodies 24-1, 242 are mated together perpendicular to the axis, as shown in FIG. 13, the pair of distal part bodies 241, 242 are combined with one another in the direction perpendicular to the axis by resilient stop relation of the resilient hook portion 46 with the stop protrusion or raised stop 48.

The distal holder 24 is the same as the proximal holder 22 in this regard.

In the above proximal holder 22, the proximal flange portion 28 is divided into two portions on a side of the other proximal half body 22-1 and on a side of the one proximal half body 22-2. In the distal holder 24, the entire distal flange portion 58 is formed integrally on a side of the other distal part body 24-2.

The distal flange portion 58 has integrally tongue-like extending parts or tongue-like pieces 92, 94, 96, 98 projecting in the direction perpendicular to the axis.

And, U-shaped cutout portions 100, 102, 104 are defined by and between the extending parts 92 and 94, 94 and 96, 96 and 98, respectively.

The cutout portions 100, 102, 104 are adapted for fitting the joint tubes 10B, 12B, 14B perpendicular to the axis therein.

According to the present embodiment, in the distal holder 24, circumferential edge portions of the distal through-holes 62, 64, 66 of the distal holding portion 60 define holder engaging portions 106, 108, 110. Each of the holder engaging portions 106, 108, 110 is to be engaged axially with one of each pair of the flanges 74, 76, 78 of the joint tubes 10B, 12B, 14B.

On the other hand, as shown in FIG. 14, circumferential edge portions of the cutout portions 100, 102, 104 in the distal flange portion 58 and the extending parts 92, 94, 96, 98 formed integrally in the distal flange portion 58 (or in the distal flange portion 58 including the extending parts 92, 94, 96, 98) define flange engaging portions 112, 114, 116. Each of the flange engaging portions 112, 114, 116 is to be engaged axially with the other of each pair of the flanges 74, 76, 78.

The distal holder 24 securely fixes or holds the joint tubes 10B, 12B, 14B through the distal holder 24 axially while the holder engaging portions 106, 108, 110 and the flange engaging portions 112, 114, 116 engage with the pairs of the flanges 74, 76, 78 of the joint tubes 10B, 12B, 14B in the axial direction. The holder engaging portions 106, 108, 110 engage with ones of the flanges 74, 76, 78 in fixed relation with respect to one axial direction, while the flange engaging portions 112, 114, 116 engage with the others of the flanges 74, 76, 78 in fixed relation with respect to the other axial direction.

In the distal holder 24, the pair of the distal part bodies 241, 24-2 are mated and combined with one another in a direction perpendicular to the axis so as to receive, clamp or sandwich the joint tubes 10B, 12B, 14B therein or therebetween, as shown in FIGS. 11 and 12.

In this state, the joint tubes 10B, 12B, 14B are held and restrained so as to be positioned perpendicular to the axis through the distal through-holes 62, 64, 66 of the distal holder 24.

And, in actual operation, as shown in FIG. 14, the joint tubes 10B, 12B, 14B are first fitted in the one distal part body 24-1 while being moved relatively therein perpendicular to the axis, then the one distal part body 24-1 is mated with the other distal part body 24-2 in the direction perpendicular to the axis, and thereby the one distal part body 24-1 is combined with the other distal part body 24-2. The one distal part body 24-1 is arranged between the pairs of flanges 74, 76, 78.

At that time, the extending parts 92, 94, 96, 98 which are formed integrally in the other distal part body 24-2 are inserted in gaps which are defined between the one distal part body 24-1 and the flanges 74, 76, 78 of the joint tubes 10B, 12B, 14B on the left side in FIG. 14.

In this state, the joint tubes 10B, 12B, 14B are restrained by or with respect to the distal holder 24 both in an axial direction and in a direction perpendicular to the axis, for example, of the piping members 10, 12, 14.

Figure 15A:
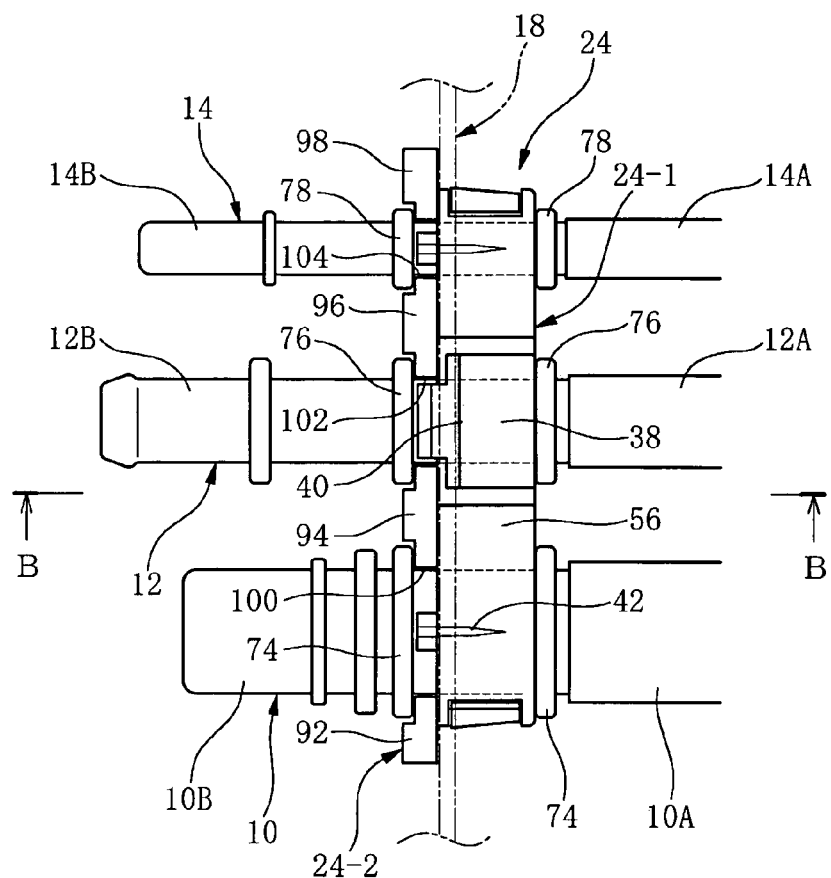
FIG. 15 (A) is a plan view showing a state that the joint tubes are held in the distal holder according to the embodiment.
Figure 15B:
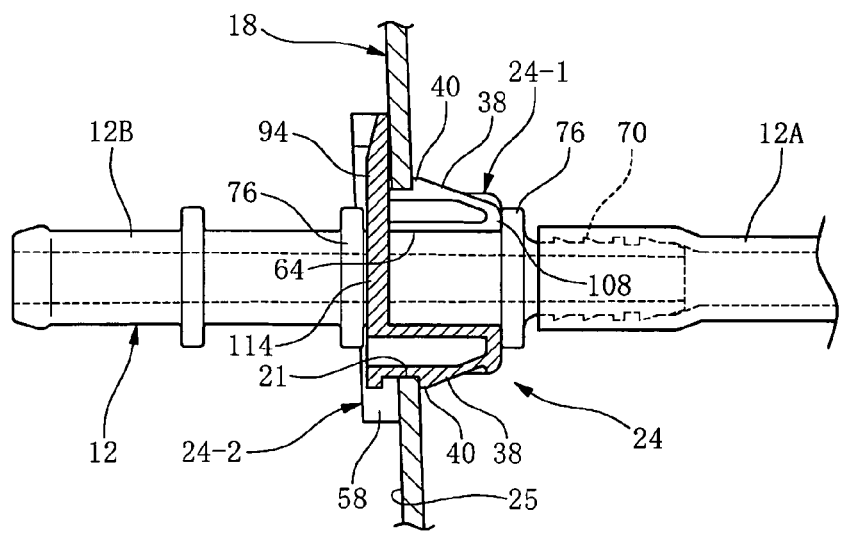

FIGS. 15 (A), (B) show the state that the joint tubes 10B, 12B, 14B are held in and by the distal holder 24 in this manner.

Next, the procedure for securely fixing or mounting the piping members 10, 12, 14 in the panels 16, 18 in this embodiment, specifically in the mounting holes 20, 21 of the panels 16, 18 therethrough respectively will be explained, with reference to FIGS. 16 (A), 16 (B), 17 (A) and 17 (B).

First, the joint tubes 10B, 12B, 14B on end portions of the piping members 10, 12, 14 are fitted in the one distal part body 241 of the distal holder 24 while being moved relatively therein perpendicular to the axis as in the state shown in FIG. 14.

This manner allows the end portions of the piping members 10, 12, 14 to be aligned both in the axial direction of the piping members 10, 12, 14 and in the direction perpendicular to the axis thereof.

And, the pair of the proximal half bodies 22-1, 22-2 of the proximal holder 22 are mated with one another in the direction perpendicular to the axis and combined with one another, and simultaneously the hoses 10A, 12A, 14A of the piping members 10, 12, 14 are arranged through the proximal through-holes 32, 34, 36 of the proximal holder 22.

Namely, the hose 10A, 12A, 14A are held and restrained so as to be positioned perpendicular to the axis in and by the proximal through-holes 32, 34, 36.

Figure 16A:
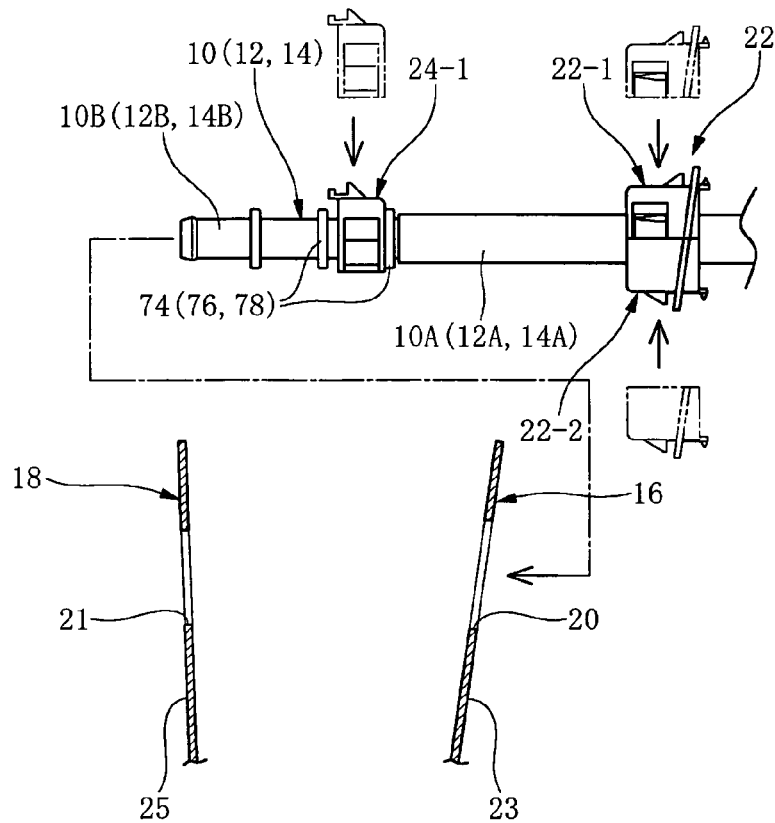
FIG. 16 (A) is an explanatory view of process of mounting or securely fixing the piping members according to the embodiment in the panels and showing a state before the piping members are inserted in mounting holes of the panels.
Figure 16B:
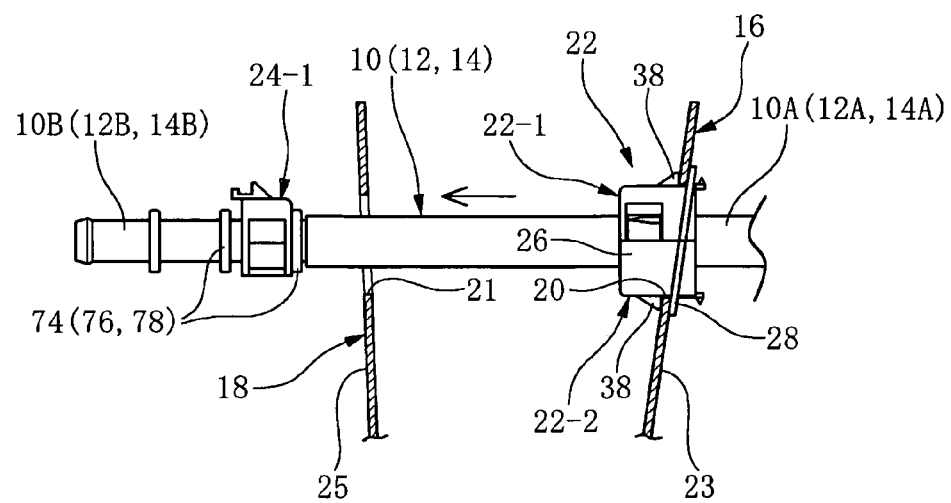

However, at this time, the hoses 10A, 12A, 14A are relatively movable axially with respect to the proximal holder 22 in the proximal through-holes 32, 34, 36, as shown in FIG. 16 (A).

Subsequently, the piping members 10, 12, 14, with the one distal part body 24-1 of the distal holder 24 on end portions thereof, are inserted through the mounting holes 20, 21 of the pair of the panels 16, 18 from the side of the outer surface 23 of the panel 16, and arranged through the mounting holes 20, 21, respectively, as shown in FIG. 16 (B). As the one distal part body 24-1 is formed so as to pass axially through the mounting holes 20, 21 of the panels 16, 18, the one distal part body 24-1 is passed through the mounting holes 20, 21 and located on the side of the outer surface 25 of the panel 18.

And, as well seen from FIG. 16 (B), in this state, the proximal holder 22 is inserted axially in the mounting hole 20 of the panel 16 from the side of the outer surface 23 of the panel 16, and securely fixed to the panel 16, specifically the mounting hole 20 thereof, under an action of the resilient lugs 38 and the proximal flange portion 28 to clamp or securely sandwich the panel 16 therebetween.

At this time, the proximal holder 22 is positioned and securely fixed perpendicular to the axis while the proximal cylindrical portion 26 is fitted in the mounting hole 20.

And, the hoses 10A, 12A, 14A are mounted in the mounting hole 20 of the panel 16 therethrough so as to be positioned perpendicular to the axis.

Figure 17A:
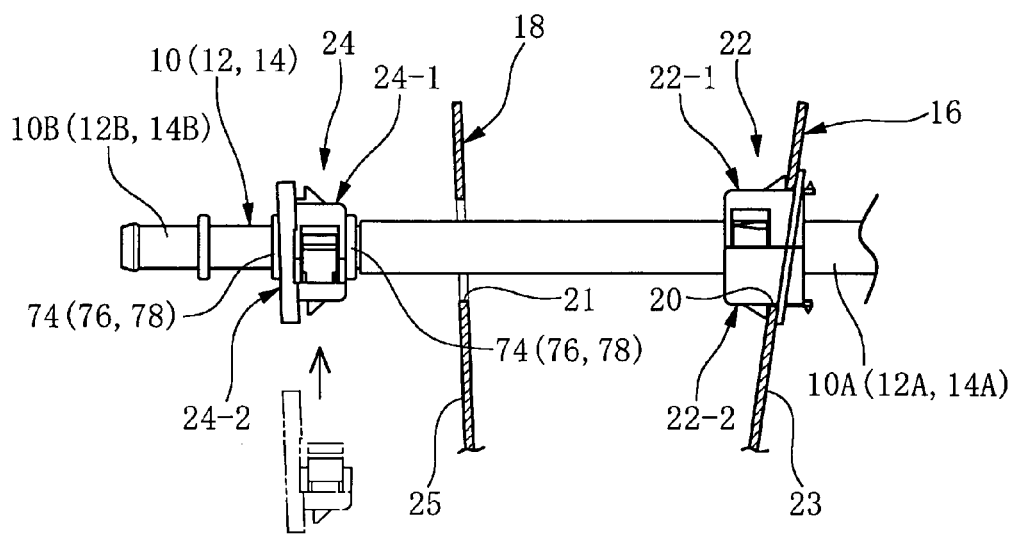
FIG. 17 (A) is an explanatory view of a process following FIG. 16 (B), and showing a state that the proximal holder is mounted in the mounting hole of the panel.
Figure 17B:
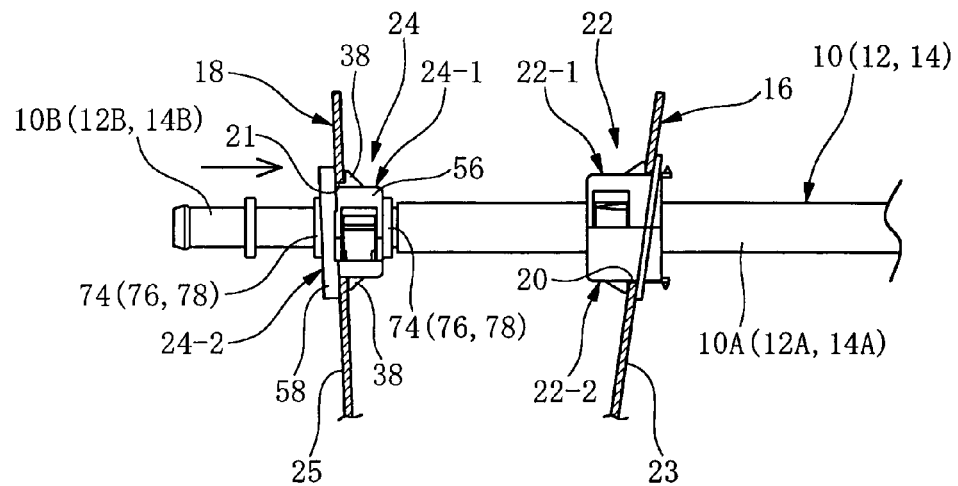
Figure 18A:
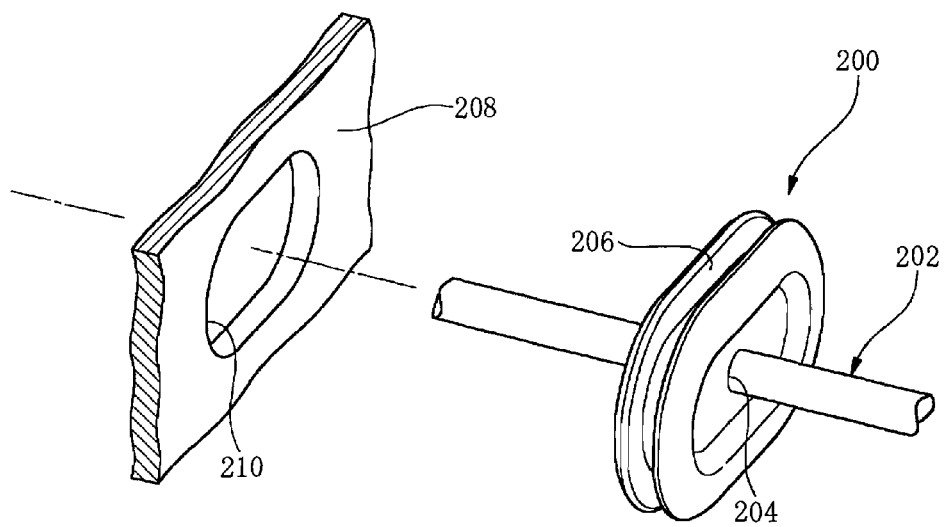
FIG. 18 (A) is a perspective view showing a type of conventional fixing device for piping member.
Figure 18B:
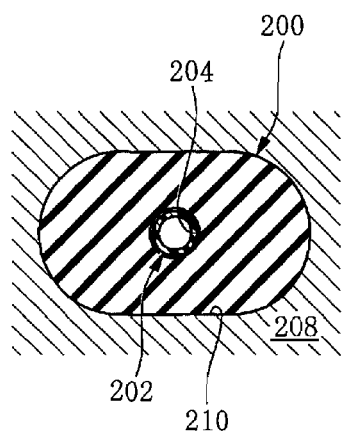
Figure 18C:
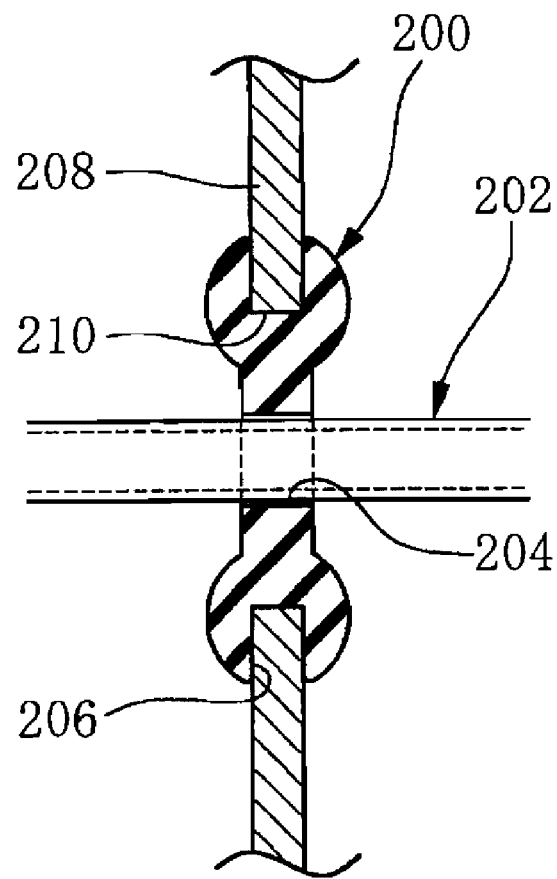
Figure 19:
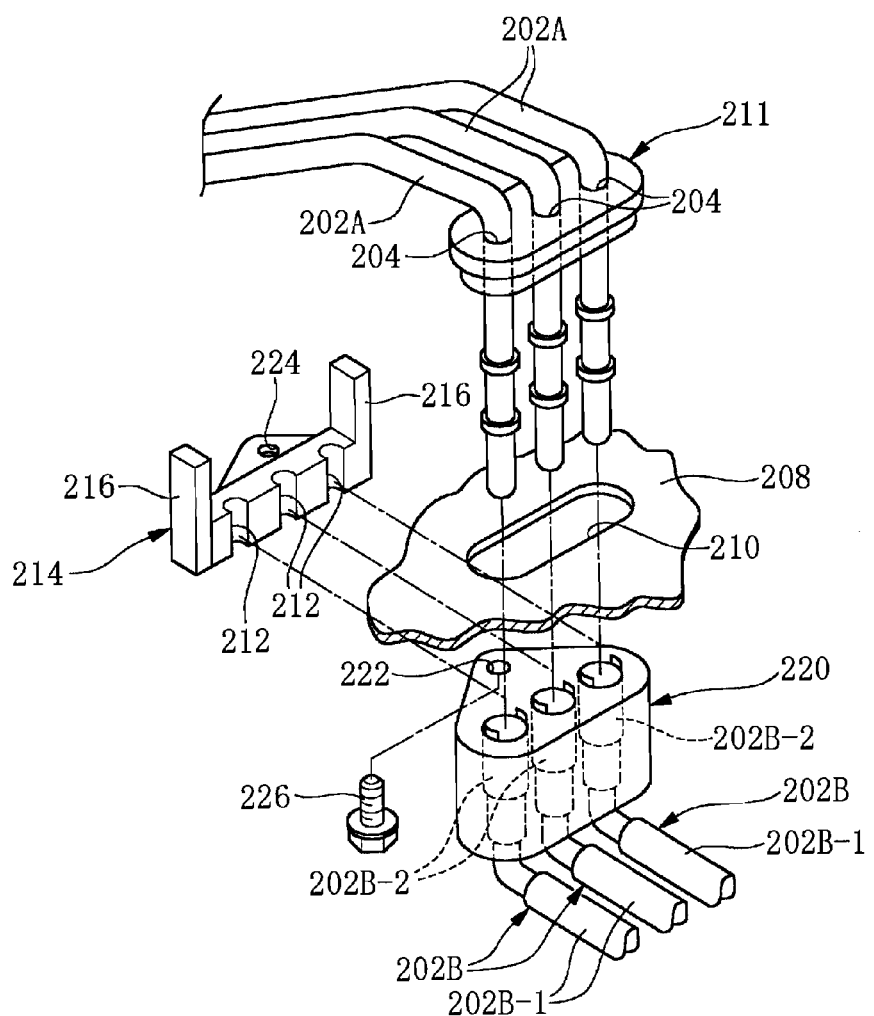
FIG. 19 is a view showing another type of a conventional fixing device for piping member, having different arrangement from the fixing device in FIG. 18 (A).

Then, as shown in FIG. 17 (A), the piping members 10, 12, 14 are pulled for a certain length along with the one distal part body 24-1 of the distal holder 24 on the side of the outer surface 25 of the panel 18. In this state, the one distal part body 24-1 is mated with the other distal part body 24-2 of the distal holder 24 in the direction perpendicular to the axis and the one and the other distal part bodies 241, 242 are combined with one another, and the joint tubes 10B, 12B, 14B on the end portions of the piping members 10, 12, 14 are received through the distal through-holes 62, 64, 66 of the distal holder 24.

Here, the joint tubes 10B, 12B, 14B are held in and restrained by the distal through-holes 62, 64, 66 so as to be positioned perpendicular to the axis, while securely fixed also in the axial direction by engagement of the holder engaging portions 106, 108, 110 and the flange engaging portions 112, 114, 116 of the distal holder 24 with the pairs of the flanges 74, 76, 78 of the joint tubes 10B, 12B, 14B, respectively.

And, in this state, the piping members 10, 12, 14 are slightly pushed back. Then, the distal holder 24 is inserted axially in the mounting hole 21 of the panel 18 from the side of the outer surface 25 thereof.

By insertion of the distal holder 24, the distal holder 24 is mounted and securely fixed in the panel 18, specifically in the mounting hole 21 thereof through a simple operation, namely, by action of the resilient lugs 38 and the distal flange portion 58 to clamp or securely sandwich the panel 18 therebetween.

While the distal holder 24 is inserted and held in the mounting hole 21 as above, the distal cylindrical portion 56 is fitted in the mounting hole 21, and thereby the distal holder 24 is securely fixed in the panel 18 so as to be positioned perpendicular to the axis.

That means, the joint tubes 10B, 12B, 14B are securely fixed in the mounting hole 21 of the panel 18 therethrough not only in the direction perpendicular to the axis but also in the axial direction, as shown in FIG. 17 (B).

Here, the proximal holder 22, which is already mounted and securely fixed in the panel 16, holds the piping members 10, 12, 14 movably relatively in the axial direction. Therefore, when the piping members 10, 12, 14 are pushed back to insert and securely fix the distal holder 24 in the mounting hole 21 of the panel 18, the distal holder 24 can be easily mounted and securely fixed in the panel 18 without resistance, while the piping members 10, 12, 14 are not bent or flexed between the pair of the panels 16, 18.

If the proximal holder 22 holds the hose 10A, 12A, 14A in fixed relation with respect to the axial direction, when an operator tries to mount and securely fix the joint tubes 10B, 12B, 14B in the mounting hole 21 of the panel 18 by means of the distal holder 24, he cannot pull out the joint tubes 10B, 12B, 14B, namely the piping members 10, 12, 14 out of the mounting hole 21 of the panel 18, outside the outer surface 25 of the panel 18 for a certain length. And, when the operator tries to insert the distal holder 24 in the mounting hole 21 from the side of the outer surface 25, he cannot push back the piping members 10, 12, 14, and therefore cannot favorably fix the joint tubes 10B, 12B, 14B in the panel 18 by means of the distal holder 24. However, according to the present embodiment, as the proximal holder 22 hold the hoses 10A, 12A, 14A movably relatively in the axial direction, even if a clearance or space between the pair of the panels 16, 18 is not accessible or not available as working clearance, the piping members 10, 12, 14 can be easily mounted or securely fixed in the mounting holes 20, 21 of the pair of the panel 16, 18, respectively, by means of the pair of the proximal and the distal holders 22, 24, through a simple operation without trouble.

In the above embodiment, the proximal holder 22 is first mounted and fixed in the mounting hole 20 of the one panel 16, and then the distal holder 24 is mounted and fixed in the mounting hole 21 of the other panel 18. However, an order for the mounting operation may be reversed. That is, the piping members 10, 12, 14 may be first mounted and fixed in the mounting hole 21 of the other panel 18 by means of the distal holder 24, and then these piping members 10, 12, 14 may be mounted or fixed in the mounting hole 20 of the one panel 16 by means of the proximal holder 22.

In this reversed order, as the hoses 10A, 12A, 14A, namely the piping members 10; 12, 14 are held movably relatively in the axial direction with respect to the proximal holder 22, even if the distal holder 24 holds the piping members 10, 12, 14 unmovable relatively in the axial direction, the operator can insert and mount the proximal holder 22 in the mounting hole 20 of the panel 16 without trouble.

Occasionally, constraint on layout design does not allow to align the mounting holes 20, 21 of the panels 16, 18 in a position perpendicular to the axis. Or occasionally, accuracy variations in hole processing, or panel bending process or the like makes the mounting holes 20, 21 of the panels 16, 18 misalign with one another in a position perpendicular to the axis. However, even in such cases, according to the present embodiment or invention, the hoses 10A, 12A, 14A and the joint tubes 10B, 12B, 14B, namely the piping members 10, 12, 14 can be positioned and firmly fixed in the mounting holes 20, 21.

According to the present embodiment as sated above, the piping members 10, 12, 14 may be passed along with the one distal part body 24-1 in the mounting hole 21 of the panel 18 in an inaccessible location.

Then, the one distal part body 24-1 and the piping members 10, 12, 14 are pulled out for a certain length in an opposite direction of an inserting side thereof, the other distal part body 24-2, which is formed with the distal flange portion or collar portion 58, is combined to the one distal part body 24-1. And, the distal holder 24 or the fit-in projecting portion of the one distal part body 24-1 is pushed back in the mounting hole 21 from a side of the outer surface 25 of the panel 18, and thereby the distal holder 24 and the piping members 10, 12, 14 are mounted or securely fixed to the panel 18.

Here, the one distal part body 24-1 is passed through the mounting hole 21 of the panel 18 together with the piping members 10, 12, 14, while assembled therewith. Accordingly, working process step is saved after the piping members 10, 12, 14 are inserted in the mounting hole 21, thereby the piping members 10, 12, 14 are easily mounted or securely fixed in the panel 18.

Also, according to the present embodiment, it facilitates easy operation to insert the piping members 10, 12, 14 in the mounting hole 21 compared to the case that the piping members 10, 12, 14 are inserted therein separately. Furthermore, there will not be such problem that an operator cannot successfully insert in the mounting hole 21 the piping members 10, 12, 14 that are not restrained in side by side relation and as a result the piping members 10, 12, 14 are damaged.

Moreover, when the piping members 10, 12, 14 are independently inserted in the mounting hole 21 and the entire distal holder 24 is mounted to the piping members 10, 12, 14 on the opposite side of the piping member insertion side, additional assembling process step is required after the piping members 10, 12, 14 are inserted therein. However, in the present embodiment, required step is just to combine the other distal part body 24-2 with the one distal part body 24-1 after that. So, assembling is simplified.

Further, according to the present embodiment or invention, the proximal half bodies 22-1, 22-2 and the distal part bodies 24-1, 242 are combined perpendicular to the axis by means of the resilient hook portions 46 and raised stops 48 provided thereon, respectively. So, the proximal half bodies 22-1, 22-2 and the distal part bodies 24-1, 242 may be combined together perpendicular to the axis automatically, just by mating the proximal half bodies 22-1 and 22-2 with one another and the distal part bodies 24-1 and 24-2 with one another, respectively.

Although the preferred embodiments of the present invention have been described in detail above, these are only some of embodiments of the present invention.

The present invention may be constructed and embodied in various configurations and modes within the scope of the present invention.

We claim:

1. A piping member assembly comprising:
   a piping member that extends in an axial direction;
   a panel that extends in a radial direction that is transverse to the axial direction, the panel having edges that define a mounting hole through which the piping member extends;
   a piping member holder configured to connect the piping member to the panel;
   wherein the piping member holder comprises:
   a first body part having a piping restraining portion, the piping restraining portion defining a recess that is configured to receive and snap fit onto the piping member in the radial direction;
   a second body part having a collar portion and a closing portion, the second body part configured to connect with the first body part in the radial direction so that the closing portion connects to the piping restraining portion and so that the closing portion closes the recess to thereby define a through-hole through which the piping member extends; and
   a fit-in projecting portion formed by the closing portion and piping restraining portion, the fit-in projecting portion having a shape that substantially corresponds to the shape of the mounting hole;
   wherein the first body part is sized smaller than the mounting hole so that the first body part can be passed entirely through the mounting hole in the axial direction;
   wherein the fit-in projection portion is inserted through the mounting hole from one side to the other side and the collar portion engages the edges of the panel on the one side to secure the piping member holder and thus the piping member to the panel;
   wherein the piping member comprises a pair of radially extending flanges that are spaced apart in the axial direction;
   wherein the piping restraining portion comprises an engaging portion and the second body part comprises an engaging portion, the respective engaging portions being positioned between the spaced apart flanges; and
   wherein the engaging portion of the piping restraining portion engages one of the flanges and the engaging portion of the second body part engages the other of the flanges to thereby secure the piping member in the axial direction.

2. The piping member assembly of claim 1, comprising a plurality of piping members extending in the axial direction and wherein the piping restraining portion is configured to restrain the plurality of piping members.

3. The piping member assembly of claim 1, further comprising a resilient lug, wherein the panel is clamped between the resilient lug and the collar portion.

* * * * *

UNITED STATES PATENT AND TRADEMARK OFFICE
CERTIFICATE OF CORRECTION

PATENT NO. : 7,464,966 B2
APPLICATION NO. : 11/168739
DATED : December 16, 2008
INVENTOR(S) : Atsuo Miyajima et al.

It is certified that error appears in the above-identified patent and that said Letters Patent is hereby corrected as shown below:

Title Page;

On the front cover of the patent, add the second Assignee:

[73] Assignee: Honda Motor Co., Ltd. (JP)

Signed and Sealed this

Twenty-fourth Day of November, 2009

David J. Kappos
*Director of the United States Patent and Trademark Office*